United States Patent [19]
Yoshida et al.

[11] Patent Number: 6,034,947
[45] Date of Patent: Mar. 7, 2000

[54] CROSS CONNECTION SYSTEM FOR TIME-DIVISION MULTIPLEXED SIGNAL

[75] Inventors: Hiroshi Yoshida, Kawasaki; Hideo Sunaga; Masashi Tanaka, both of Yokohama, all of Japan

[73] Assignee: Fujitsu Limited, Kanagawa, Japan

[21] Appl. No.: 08/851,425

[22] Filed: May 5, 1997

[30] Foreign Application Priority Data

Oct. 7, 1996 [JP] Japan ................................. 8-180208

[51] Int. Cl.[7] ...................................................... H04J 3/02
[52] U.S. Cl. ........................ 370/244; 370/376; 370/907
[58] Field of Search .................................. 370/242, 223, 370/224, 907, 505, 506, 243, 244, 248, 376, 516, 517

[56] References Cited

U.S. PATENT DOCUMENTS

| | | |
|---|---|---|
| 4,820,992 | 4/1989 | Avis . |
| 4,935,921 | 6/1990 | Ishizaki et al. ................. 370/505 |
| 5,406,255 | 4/1995 | Fujimoto et al. ............... 370/242 |
| 5,553,176 | 9/1996 | DeMarco, Jr. . |

*Primary Examiner*—Chau Nguyen
*Assistant Examiner*—Eva Tang
*Attorney, Agent, or Firm*—Helfgott & Kraus, P.C.

[57] ABSTRACT

Provided is a cross connection system for time-division multiplexed signals, upon detection of deterioration in quality, performs line setting to easily switch to a line having another directional orientation. The cross connection system receives an SDH interface signal, separates a virtual container line signal that is multiplexed into the SDH interface signal and connects the virtual container line to one of a number of output terminals, and is constituted by a signal receiver for receiving a primary signal, for detecting alarm information contained in the primary signal that is received, and for performing conversion of the primary signal in consonance with an occasion when the alarm information is detected, a signal synchronizer for, upon receipt of the primary signal and the alarm signal from the signal receiver, switching phases for the primary signal and the alarm information by using a first clock and for outputting the results, and a TSI function section for exchanging the primary signals received from the signal synchronizer for individual time slots of the primary signals.

14 Claims, 34 Drawing Sheets

Fig. 14

| | column No. | 100 | 101 | |
|---|---|---|---|---|
| memory input time | | A | B | |

| | | | | |
|---|---|---|---|---|
| memory output time | | B | A | |

| (3) | (1) | through ALM | memory ALM | selection signal |
|---|---|---|---|---|
| no redundancy | through | × | × | through |
| no redundancy | DATA memory | × | × | DATA memory |
| redundant | × | NO ALM | NO ALM | hold previous row state |
| redundant | × | NO ALM | SD | through |
| redundant | × | NO ALM | SF | through |
| redundant | × | SD | SD | hold previous row state |
| redundant | × | SD | SF | |
| redundant | × | SF | SF | hold previous row state |

×: don't care

Fig. 33

CROSS CONNECTION SYSTEM FOR TIME-DIVISION MULTIPLEXED SIGNAL

BACKGROUND OF THE INVENTION

1. Field of the Invention

The present invention relates to a cross connection (line setting) system for time-division multiplexed signals, and in particular to a cross connection system that includes a path switch in the exchange system for exchanging time-division multiplexed signals provided for an SDH (Synchronous Digital Hierarchy) network.

2. Related Arts

The SDH technique is an internationally standardized multiplex method that can be efficiently applied for telephone services and other services in transmission text data and picture image data.

In consonance with the progress that has been made in techniques concerning cross connection (line setting) apparatuses, a system where transmission lines for an entire network can be freely changed and improvements in the reliability of the transmission lines are demanded for recent transmission apparatuses.

Referring to FIG. 34, the connection setting for line signals VC-n can be freely changed by making a setup change. FIG. 34 shows the concept of a cross connection (line setting) apparatus that has the center role in an exchange system for exchanging time-division signals. As is shown in FIG. 34, a plurality of SDH interface frame signals, called STM-n (Synchronous Transmission Module Level n), are input. Line signals VC-n, which were multiplexed to obtain the STM-n frame signals, are extracted, and output terminals are determined to which VC-n signals are connected across the individual transmission lines. Then, the VC-n signals that have been set as described above are multiplexed again to obtain and output STM-n frame signals.

The STM-n frame signals are multiplexed transmission signals carried on the SDH network, and four different values, 0, 1, 4 and 16, are defined as the values for n at the synchronous transmission module level, the four values corresponding to the synchronous digital hierarchy levels, respectively. STM-1 is a base multiplex unit for the SDH network.

The line signals VC-n correspond to a box, called a virtual container, that is specified to multiplex various items of information as byte units. In addition to VC-4 that has a maximum bit rate of 150 Mbps and a retained information speed of 138 Mbps, there are VC-11, VC-12, VC-2 and VC3, which respectively have speeds corresponding to those for retained information.

Further, in FIG. 34, the connection setting for the VC-n signals can be freely changed by the alteration of the setup.

For a line that has only one output direction but has two input connections, as indicated in FIG. 34 by a solid line and a broken line, the same signal is passed along different routes from a cross connection apparatus at one location. In this case, the solid line indicates an active (ACT) line and the broken line indicates a standby (STB) line, and when deterioration of a signal carried on the ACT line is detected, the connection can be automatically changed to the STB line.

On the other hand, a line having outputs in two directions, relative to an input from one direction, is used to output the same signal in different directions in order to provide a redundant line connection. UNEQ (unequipped) denotes an empty time slot to which a line is not inserted.

As was previously described, to improve a system wherein the lines in a network can be freely changed, and to improve the reliability of the lines, an active and standby line redundancy system is employed for connecting the cross connection (line setting) apparatuses A and B, as is shown in FIG. 35.

In addition, as is shown in FIG. 36, in a RING application, transmission devices A through D having a limited function of line setting, called an Add/Drop multiplex function, are provided with individual line redundancy.

Since the conventional cross connection (line setting) apparatus employs the redundancy method performed across the multiplex STM-n lines, it can cope with the defect between the lines but can not handle a malfunction at the transmission device. Further, as active and standby transmission paths are provided on the same route, when both the active and standby transmission paths may be obstacles at the same time, the reliability of the cross connection apparatus has become low.

In the RING application, line redundancy can be applied only for a limited application, and it is difficult to constitute a line redundancy in a complicated network employing cross connection (line setting) apparatuses.

SUMMARY OF THE INVENTION

It is, therefore, one object of the present invention to provide an exchange system for exchanging time-division signal, while following wired communication system standards as specified by ITU (International Telecommunication Union) or SONET (Synchronous Optical Network), for performing line settings so that when monitoring detects deterioration of signal quality on a line, the transmission line can be easily switched to another line having a different directional orientation.

To achieve the above object of the present invention, a time-division signal exchange system, which receives an SDH interface signal, separates a virtual container line signal that is multiplexed into the SDH interface signal and connects the virtual container line to one of a number of output terminals, comprises:

a signal receiver for receiving a primary signal, for detecting alarm information contained in the primary signal that is received, and for performing conversion of the primary signal in consonance with an occasion when the alarm information is detected;

a signal synchronizer for, upon receipt of the primary signal and the alarm signal from the signal receiver, switching phases for the primary signal and the alarm information by using a first clock and for outputting the results; and a TSI function section for exchanging the primary signals received from the signal synchronizer for individual time slots of the primary signals.

BRIEF DESCRIPTION OF THE DRAWINGS

FIG. 14 are diagrams showing an example where time slots are switched by the TSI circuit;

FIG. 24 is a time chart (1) for individual signals for the embodiment shown in FIG. 21;

FIG. 25 is a time chart (2) for the individual signals for the embodiment shown in FIG. 21;

FIG. 28 is a diagram showing a table for explaining the determinations of a selector;

FIG. 30 is a time chart (2) for the individual signals for the embodiment shown in FIG. 26;

FIG. 32 is a time chart (1) for individual signals for the embodiment shown in FIG. 31;

FIG. 33 is a time chart (2) for the individual signals for the embodiment shown in FIG. 31;

DETAILED DESCRIPTION OF THE PREFERRED EMBODIMENTS

Figure 1:
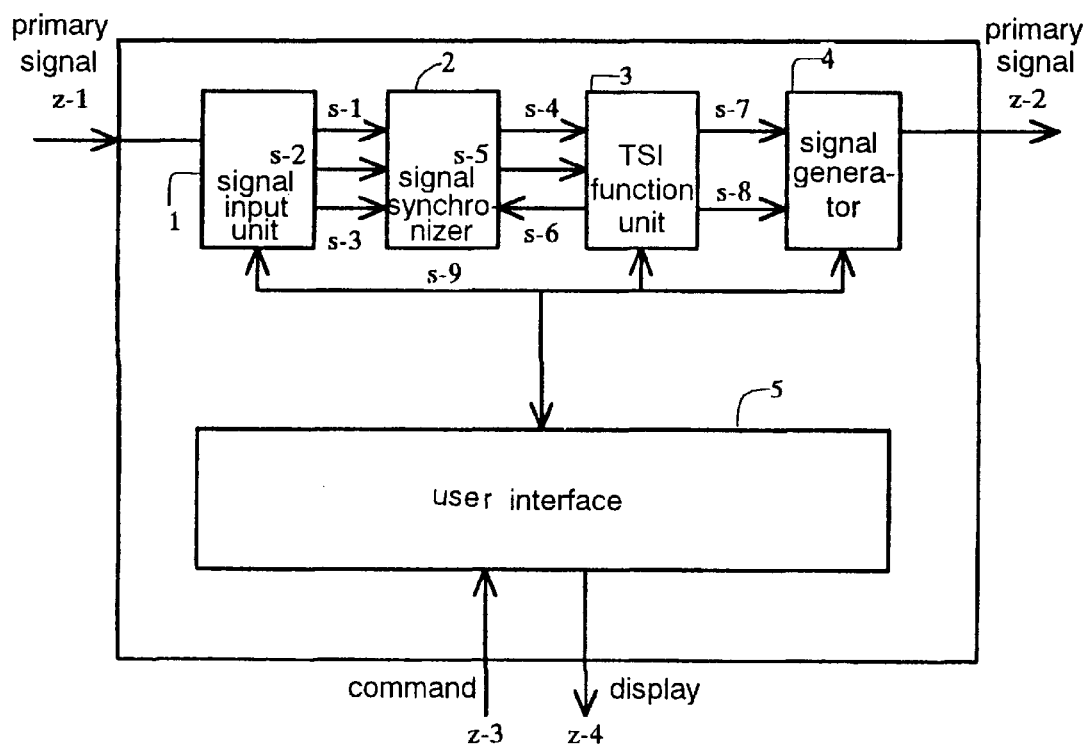
FIG. 1 is a functional block diagram illustrating a line setting apparatus according to the present invention.

The preferred embodiment of the present invention will now be described while referring to the accompanying drawings. The same reference numerals are used to denote corresponding or identical components in the individual drawings.

FIG. 1 is a functional block diagram illustrating a line setting apparatus according to the present invention. The fundamental functions of the line setting apparatus include:

1) a function for inputting a transmission signal as primary signal (z-1);
2) signal synchronization;
3) a TSI (Time Slot Interchange) function for interchanging time slots;
4) a function for outputting a primary signal (z-2); and
5) a user interface function.

A trunk signal, which is the primary signal, is formed by multiplexing low speed signals as a high speed signal. For example, an STM-1 signal having a transmission speed of 155.52 Mbit/s specified by ITU is formed by multiplexing TU-12 signals having transmission speed of 2.304 Mbit/s for the equivalent of 63 channels.

The TSI processing by a TSI unit 3 is performed to change the constitution of low-speed signals that are multiplexed to obtain a high-speed signal, or to replace a high-speed signal with another high-speed signal. One of the features of the cross connection (line setting) apparatus according to the present invention provides such a TSI function.

The individual functions of the blocks shown in FIG. 1 will be further explained. First, an input processor 1 receives a primary signal z-1 for example, a STM-1 optical signal, detects ALM data, and outputs an alarm (ALM) data signal s-3 to a signal synchronizer 2 across a microcomputer bus s-9. In consonance with an occasion where an ALM has occurred, the input processor 1 converts the primary signal z-1 into an AIS signal and outputs it as a primary signal s-1. The signal s-2, which is also output from the input processor 1, is a clock signal.

The signal synchronizer 2 obtains the phases for the pri s-1 and the ALM data signal s-3 from the signal input processor 1, and exchanges them with those for a clock signal s-6, which is obtained from the TSI unit 3, and outputs the results as signals s-4 and s-5.

The signal synchronizer 2 outputs these signals while aligning the positions of the first bytes of the signals with individual lines called vc (virtual containers). In general, the signal synchronizer 2 also serves as elastic memory and absorbs changes in frequencies that occur between the signal input processor 1 and the TSI unit 3.

The TSI unit 3 replaces the primary signal s-4 from the signal synchronizer 2 in each time slot, and outputs the result as a signal s-7 in a different sequential order. At this time, based on the ALM data signal s-5 and in consonance with the occurrence of the ALM, the contents of the signal s-7 are changed.

At the same time, a clock s-8 is output, which has the same phase as a timing pulse indicating the head of the signal s-7.

An output processor 4 receives the primary signal s-7 and the clock signal s-8, and converts them into an optical signal z-2 that it outputs. Overhead data from a user interface 5 is fetched across a bus interface s-9, and inserted into the primary signal s-7.

The detailed arrangement of the individual functional blocks will now be described.

1) Input processor 1 for inputting a transmission signal as a primary signal z-1:

In order to process a received primary signal z-1, the position of the head of the signal must be determined. First, decoding for example, descrambling of the primary signal z-1 is performed to determine the head position of the primary signal z-1.

The primary signal z-1 includes a special signal indicating the head position e.g., a fixed bit pattern A1 byte, for obtaining frame synchronization, to be inserted into the overhead section of the signal STM-4. This special signal is used to perform synchronization.

The synchronizer 12 performs this synchronization, and is constituted by a counter having a frame cycle and a pattern detector. The positions of various overhead signals and the position of a low-speed signal, which exist in the primary signal z-1, can be specified by the counter. Therefore, the process for extracting individual low-speed signals can be enabled as needed. This process is called demultiplication (DMUX).

The individual overhead data that have been extracted are transferred to an overhead data processor 13, which calculates the data e.g., the counting of the performances of B1, B2 and B3 bytes. The detected ALM is transferred to an ALM processor 11.

The ALM processor 11 collects various signals that are detected by a signal receiver 10, and processes them in the order of their priorities and for example, the ALM processor 11 inhibits synchronous detection of signals when the absence of signals is detected.

As the result of these processes, an ALM data signal a-6 and overhead data signal a-7 are transmitted to the user interface 5 via a bus interface circuit 14.

Sometimes, because of the occurring of an ALM, it is necessary for the primary signal z-1 to be processed to produce a special signal. An AIS process which is performed when reception of an optical signal is halted, is an example process. This process is performed by a signal converter 15. In the AIS process, a signal is masked and is set to "1" in accordance with the occurrence of the ALM.

Figure 2:
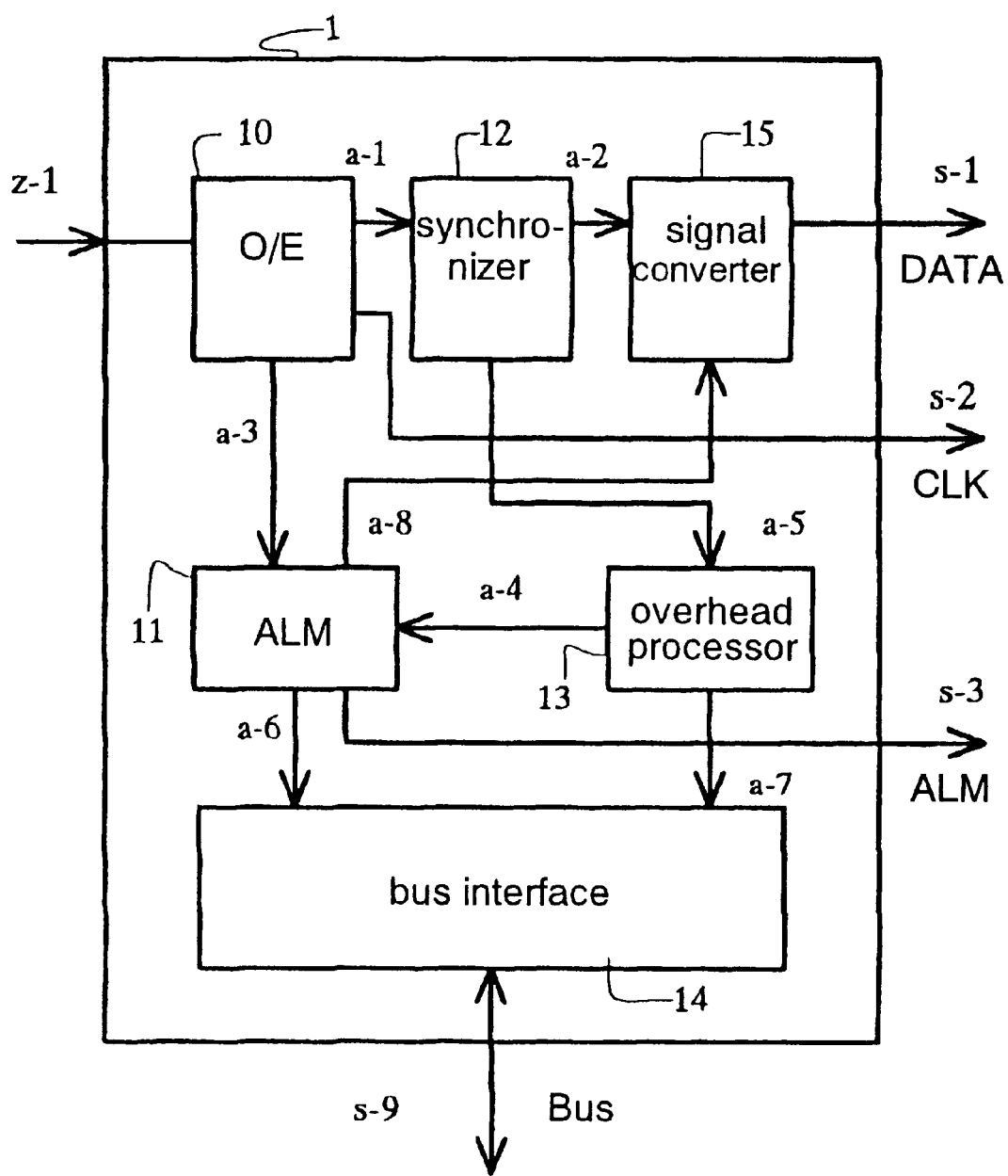
FIG. 2 is a functional block diagram illustrating an example arrangement of an input processor.

FIG. 2 is a functional block diagram illustrating the input processor 1. When a received primary signal z-1 is an optical signal, it must be converted into an electric signal. An optical to electrical signal converter 10 performs the conversion of the optical signal to an electrical signal, and the thus produced electrical signal is then output as signal a-1. A clock signal s-2 is also extracted.

Figure 3:
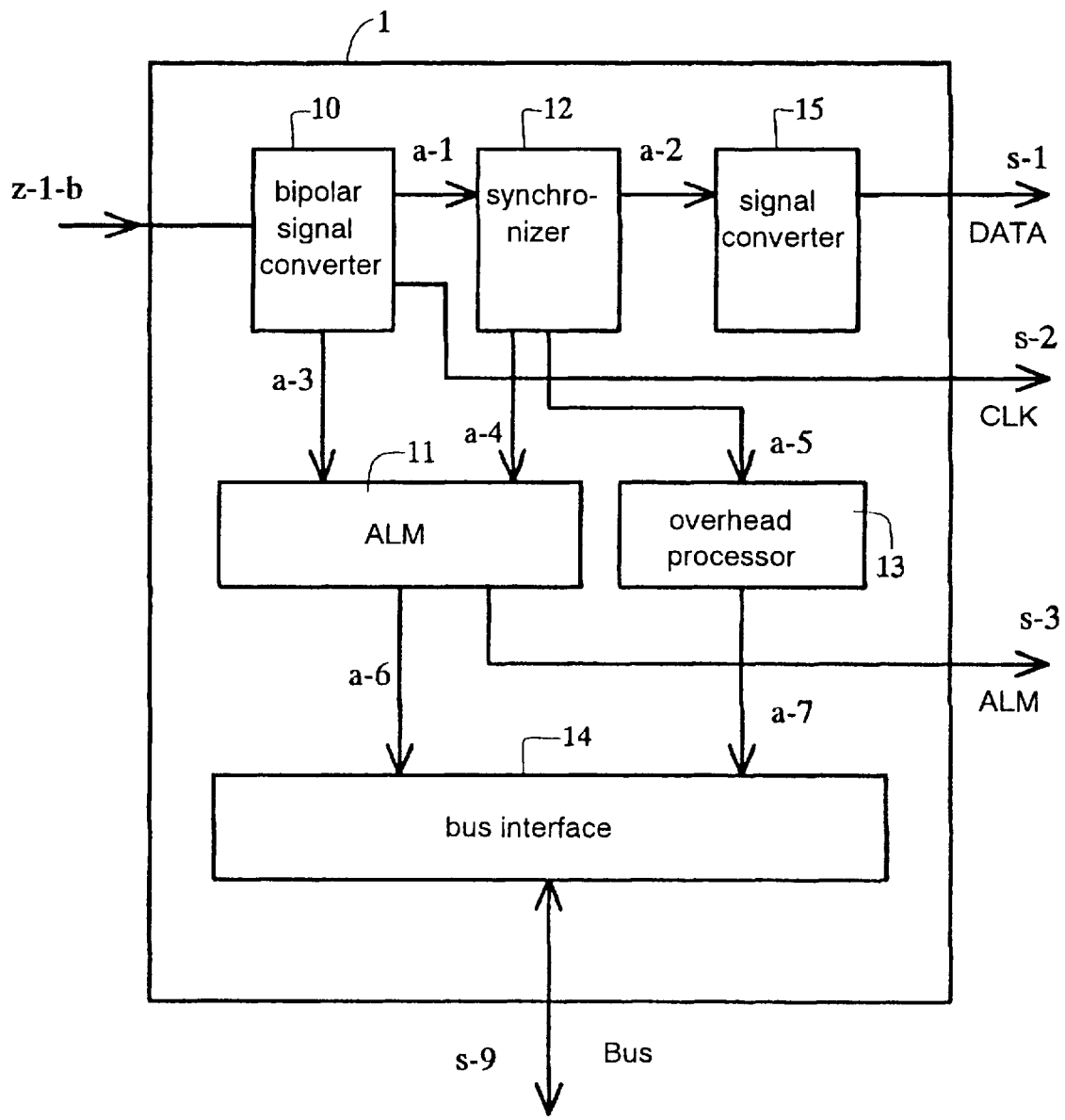
FIG. 3 is a functional block diagram illustrating the arrangement of an input processor when an input primary signal z-1 is a bipolar signal.

FIG. 3 is a diagram illustrating an example arrangement where the received primary signal z-1 is a bipolar signal. In this arrangement, a bipolar signal converter 10 is provided instead of the optical to electrical signal converter 10.

The bipolar signal converter 10 receives an electrical signal z-1-b, which has a bipolar form that is specified by ITU or SONET, and extracts a data element a-1 having a NRZ form and a clock element signal (CLK) s-2 from the electrical signal.

The optical to electrical signal converter 10 in FIG. 2 receives an optical transmission signal z-1 having a form specified by ITU or SONET, and extracts a data element a-1 having a NRZ form and a clock element signal (CLK) s-2 from the optical signal. In addition, the converter 10 detects an ALM data signal a-3 e.g., reception signal level, which indicates there is an abnormality in the received signal, and notifies the ALM processor 11.

Similarly, in FIG. 3, an alarm data signal (ALM) a-3, which indicates that either the input optical signal or the input bipolar signal has a predetermined level or higher, is transferred to an ALM detector 11.

A synchronizer 12 fetches the data element signal a-1 from the optical signal to electrical signal converter 10 or the bipolar converter 10, and extracts a signal a-2 and an a-5 of a low-order group, which is multiplexed in a high-order group. The signal a-2 is transferred to a signal converter 15, and the overhead data signal a-5 is transferred to an overhead data processor 13.

Upon its receipt, the data signal a-5 is processed by the overhead processor 13, i.e., performance data is calculated using B1 byte (Byte) data. Of this data, the ALM data is output as a signal a-4, and the other data is output as a signal a-7. In the arrangement in FIG. 3, the ALM data signal a-4 is transferred directly from the synchronizer 12.

Upon receipt of the signals a-3 and a-4, the ALM processor 11 performs sequential priority order processing of them and outputs a control signal a-8, which serves as a signal conversion trigger for the signal converter 15, and an ALM data signal s-3.

In response to the control signal a-8, the signal converter 15 converts the primary signal a-2 received from the synchronizer 12 into another signal, such as an AIS signal, which is in turn output as a signal s-1.

A bus interface circuit 14 fetches the signals a-6 and a-7 from the ALM processor 11 and the overhead data processor 13, and converts them into bus data signal s-9, which is then output.

2) Signal synchronizer 2

Figure 4:
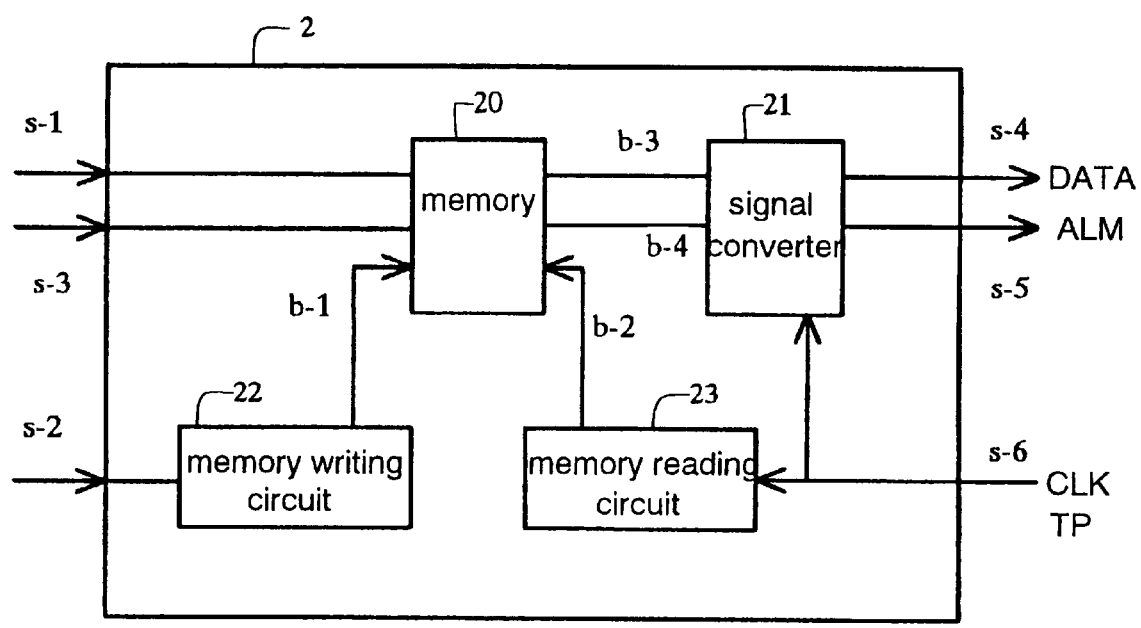
FIG. 4 is a block diagram illustrating an example arrangement of a signal synchronizer.

In accordance with clock signal s-6 from the TSI unit 3, the signal synchronizer 2 changes the phases of the primary signal s-1 and the ALM data signal s-3, which have been transferred from the input processor 1, and outputs the results as signals s-4 and s-5. As is shown in FIG. 4, the signal synchronizer 2 is constituted by a memory circuit 20, a signal form converter 21, a memory write circuit 22 and a memory reading circuit 23.

The memory circuit 20, a device for temporarily storing a signal in a matrix form, writes the primary signal s-1 and the ALM data signal s-3, which are received from the input processor 1, in synchronization with a write clock signal b-1 from the memory write circuit 22.

In addition, in accordance with a read clock signal b-2 from the memory read circuit 23, the memory circuit 20 also reads all the stored data, or the data signal (DATA) b-3 in the VC portion and an associated ALM data signal b-4.

If the data signal (DATA) b-3 read from the memory circuit 20 carries all the contents related to the signal s-1, the signals b-3 and b-4 converted from serial to parallel to obtain a form that can easily be handled by the signal form converter 21.

When the read out data (DATA) signal b-3 is a VC, the signal form converter 21 inserts a fixed stuff signal or an overhead signal therein to align the positions of the head bytes for individual channel signals, and outputs the resultant signal as signal s-4.

The timing for the ALM data signal b-4 is adjusted so that its phase matches that of the primary signal s-4, and the adjusted ALM data signal b-4 is output as ALM signal s-5.

Figure 5:
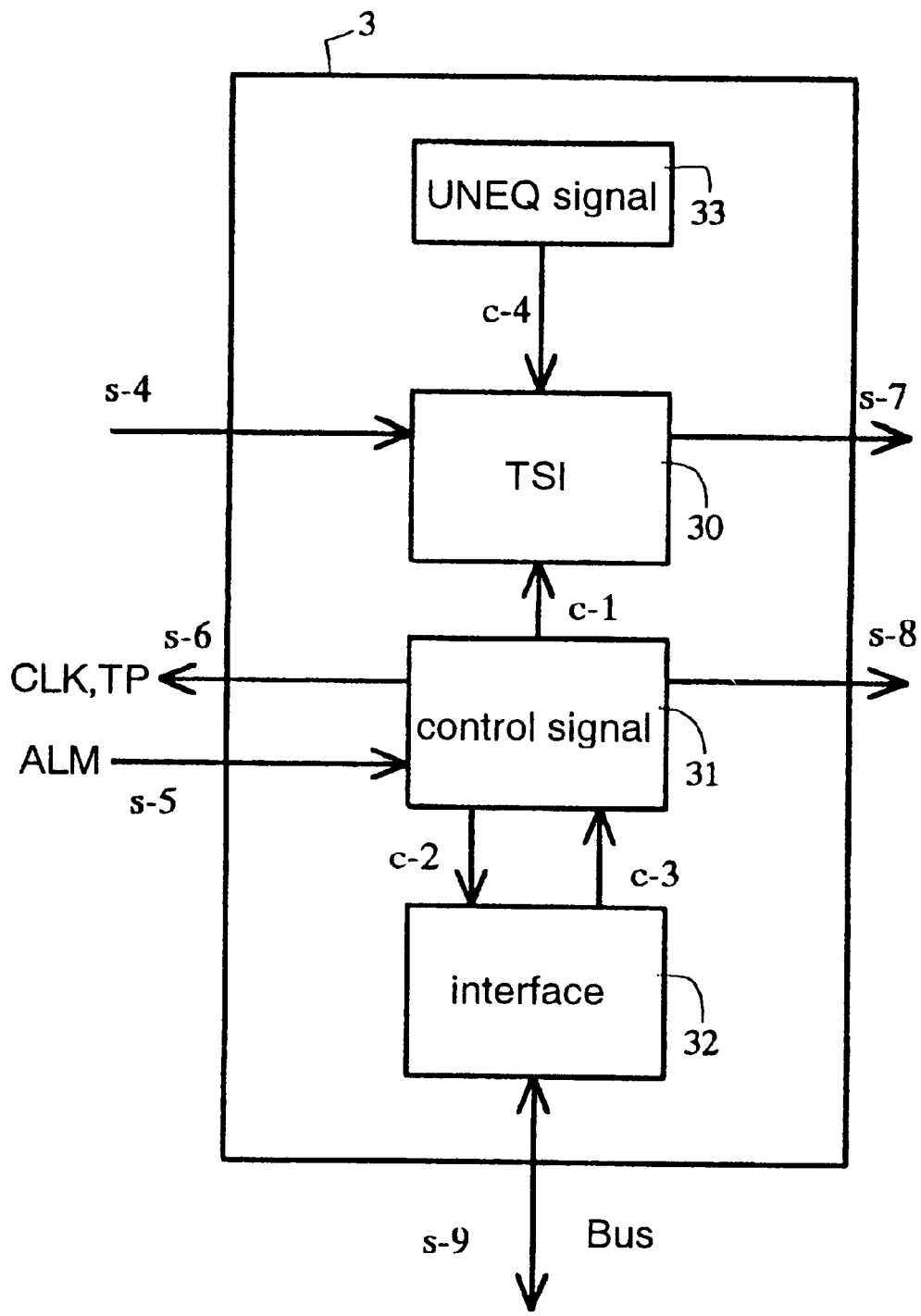
FIG. 5 is a block diagram illustrating the arrangement of a TSI function unit.

3) TSI unit 3:

One example arrangement of the TSI unit 3 is shown in FIG. 5. The TSI unit 3 comprises a TSI circuit 30, a control signal generator 31, a bus interface circuit 32, and an UNEQUIPPED signal generator 33. The TSI circuit 30 stores a received primary signal s-4 in a memory (not shown in FIG. 5) that is a part of the TSI circuit 30. The control signal is read out as a primary signal s-7 in consonance with a control signal c-1 from the control signal generator 31.

At this time, TSI (Time Slot Interchange) is performed by reading signals in a sequential order that differs from the order in which they were input.

The UNEQUIPPED signal generator 33 generates and outputs an UNEQUIPPED signal, so that the UNEQUIPPED signal is also subject to the TSI processing.

To perform the TSI processing, the head positions, at individual levels, of the primary signal s-4, which is input to the TSI unit 3 are determined. First, J1 byte in a virtual container VC-4 having a bit rate of 150.336 Mb/s is set.

Figure 6:
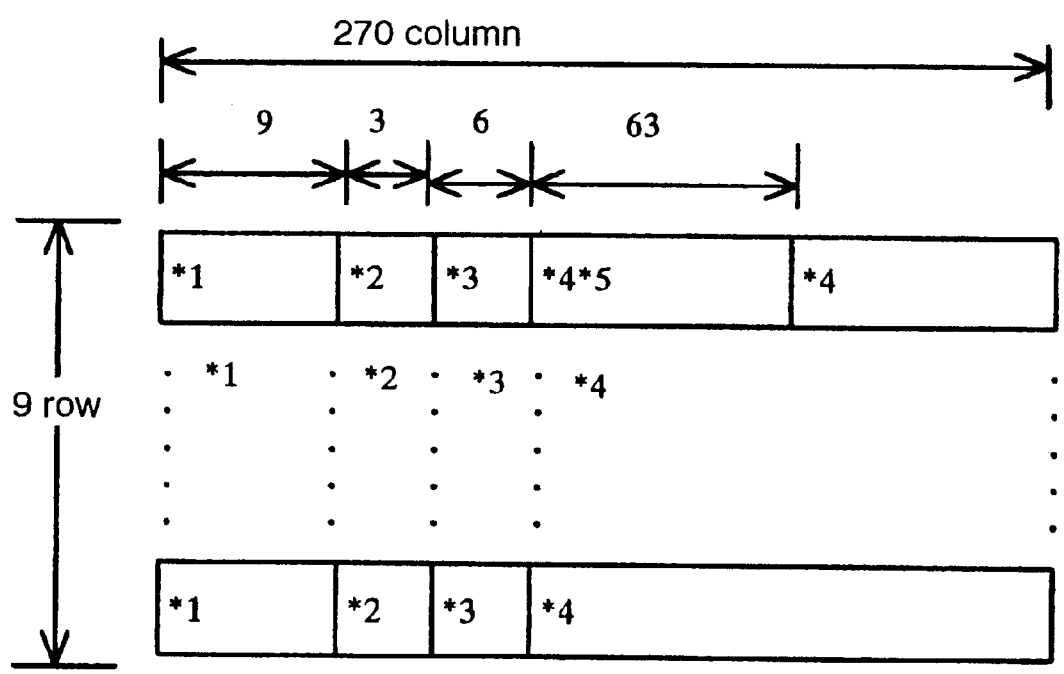
FIG. 6 is a diagram showing an example where a STM-1 signal whose phase is synchronized is mapped in a form STM-1>AU-4>TUG-3>TUG-2>TU-12/TU-2.
Figure 7A:
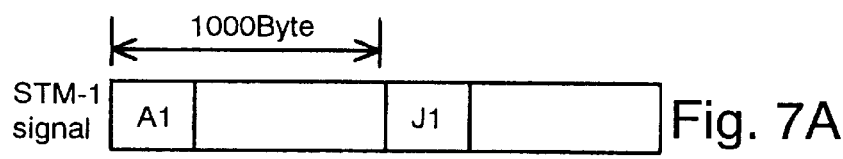
FIGS. 7A–7E are diagrams for explaining the process for reading a primary signal (VC-4 signal) from the memory of the signal synchronizer.
Figure 7B:
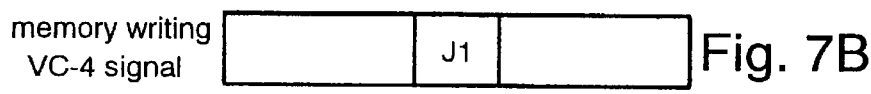
Figure 7C:
Figure 7D:
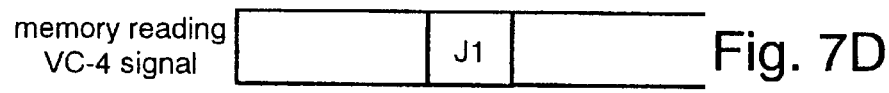
Figure 7E:
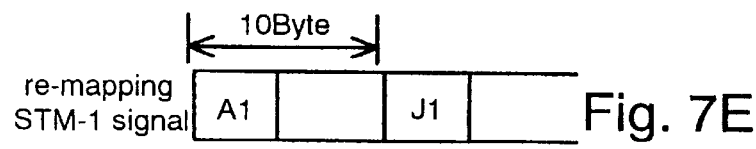

FIG. 6 shows a STM-1 signal having a synchronized phase, the signal being mapped in the form STM-1>AU-4>TUG-3>TUG-2>TU-12/TU-2.

*1 in FIG. 6 indicates the mapping position for the overhead of the STM-1, the first byte being defined as an A1 byte. As a result, the pointer byte of TU-3 and V1 byte of TU-2/Tu-12 are positioned at the first row, and the signals for all the hierarchial levels are neatly arranged.

To achieve this arrangement, the VC-4 signal is extracted from the STM-1 signal and is stored in the memory. Re-mapping is performed for this signal at a predetermined timing at which the mapping having the above form is available. This process takes place in the signal synchronizer 2.

The reading out of a primary signal (VC-4 signal) from the memory 20 of the signal synchronizer 2 is correlated with a predetermined timing signal s-6, which is required by the TSI unit 3. Then, the mapping is performed in the signal form as shown in FIG. 6.

This processing is shown in FIG. 7. A STM-1 signal is again stored in the memory of the TSI circuit 30 to perform the TSI process. The STM-1 signal is developed in advance into parallel signals to facilitate its writing to the memory.

Since in the STM-1 signal one byte is the minimum signal unit carrying the meaning, accordingly, the signal is developed into eight parallel signals. This process is performed by the memory reading circuit 23 of the signal synchronizer 2.

To switch the buses, an ALM signal is provided in consonance with the number of bytes. For example, one ALM signal is provided for eight primary signals.

Figure 8:
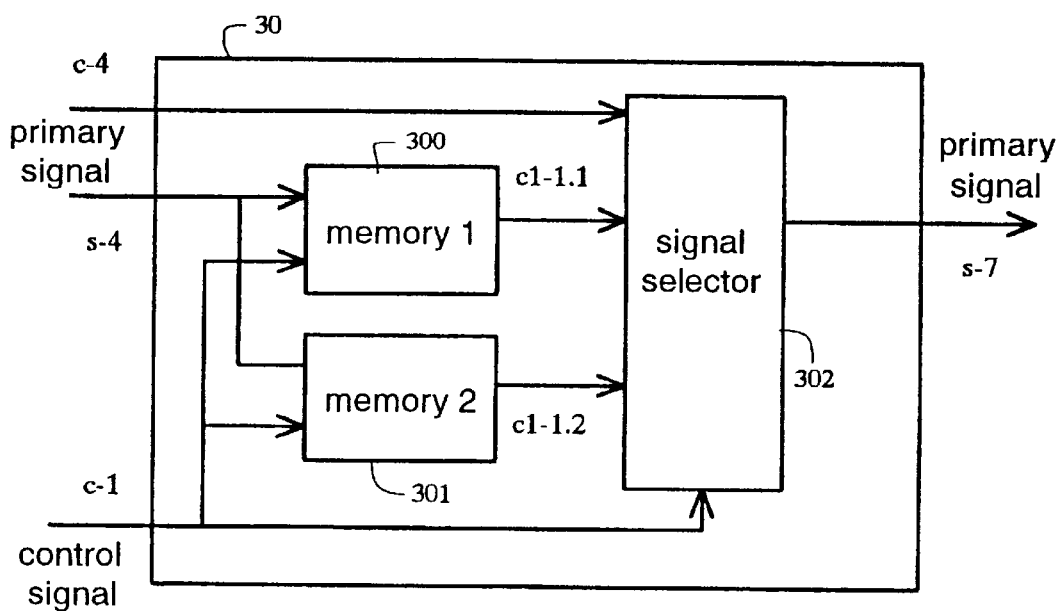
FIG. 8 is a block diagram illustrating an example arrangement for a TSI circuit in the TSI function unit.
Figure 9:
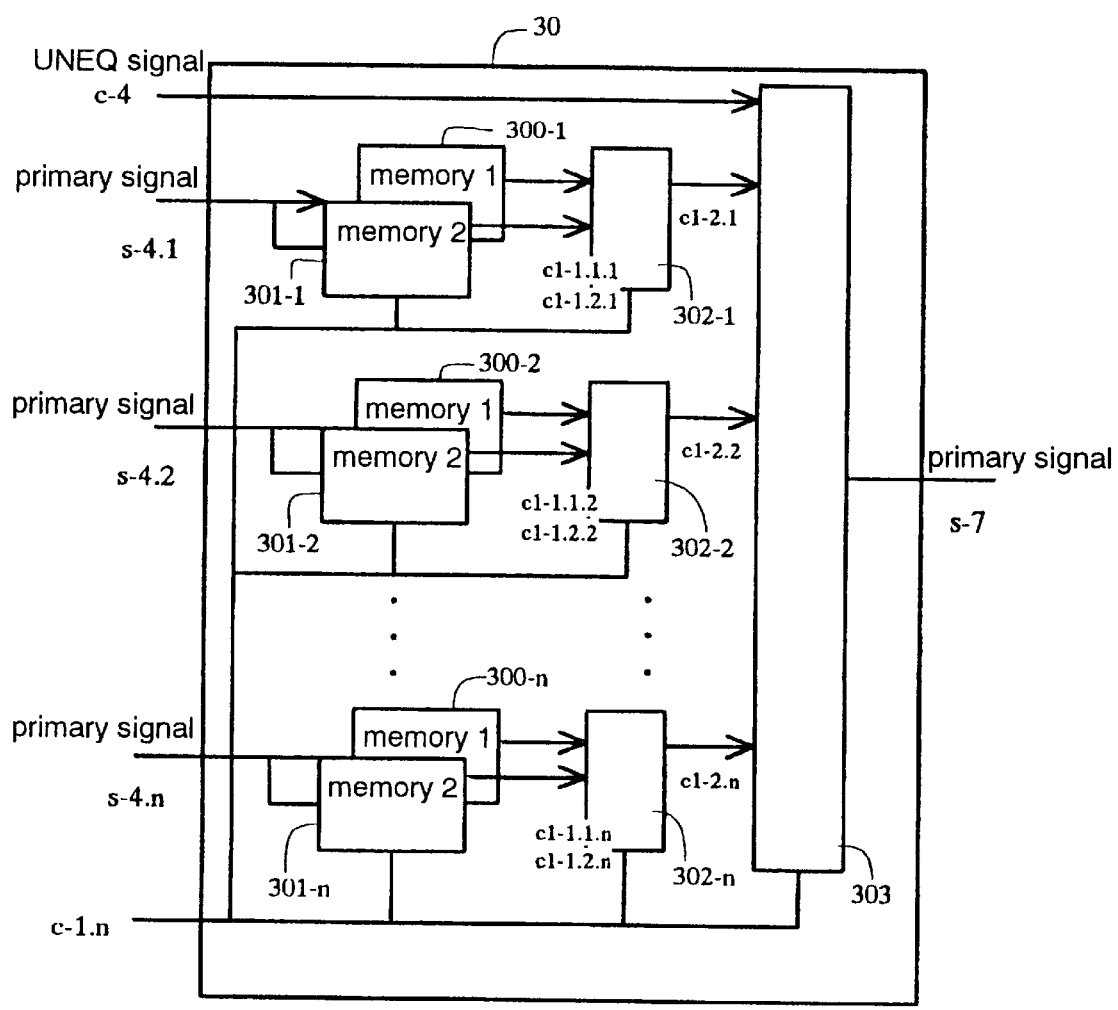
FIG. 9 is a block diagram illustrating another example arrangement for the TSI circuit in the TSI function unit.
Figure 10:
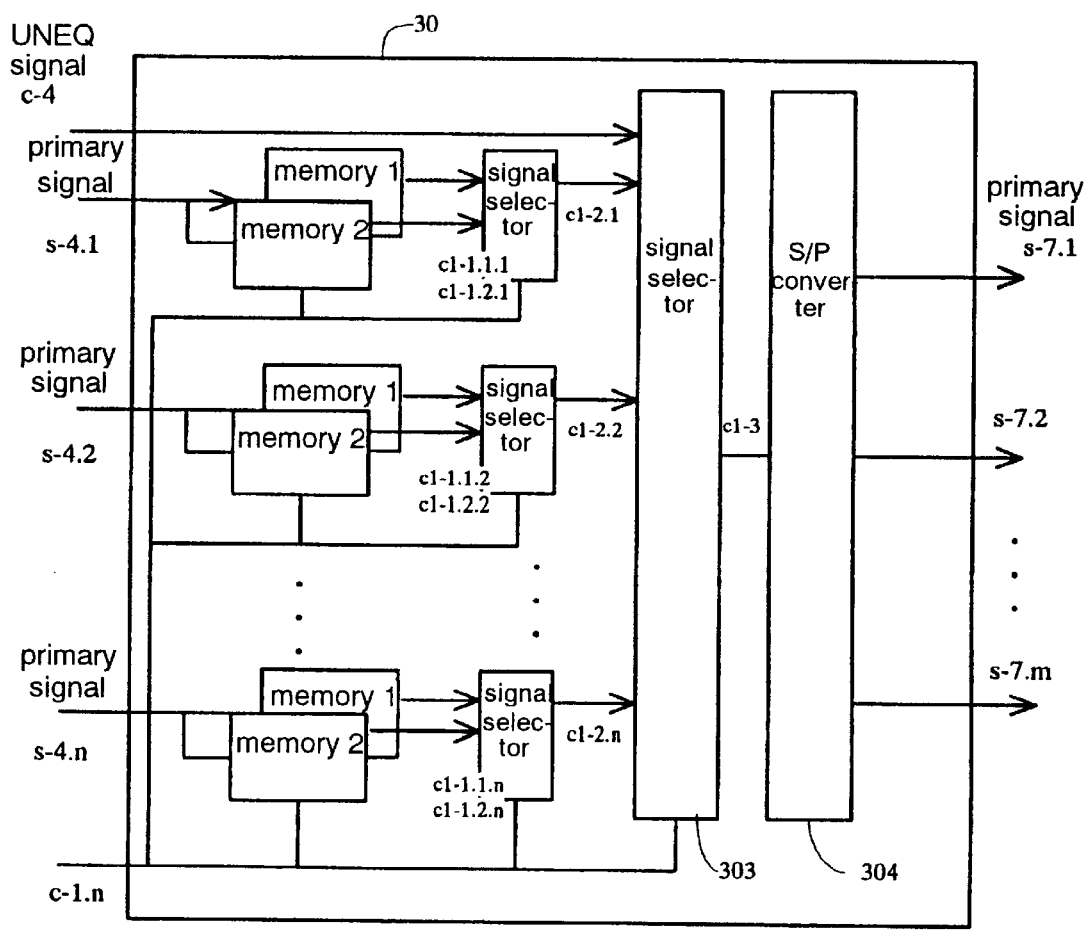
FIG. 10 is a block diagram illustrating an additional example arrangement for the TSI circuit in the TSI function unit.
Figure 11:
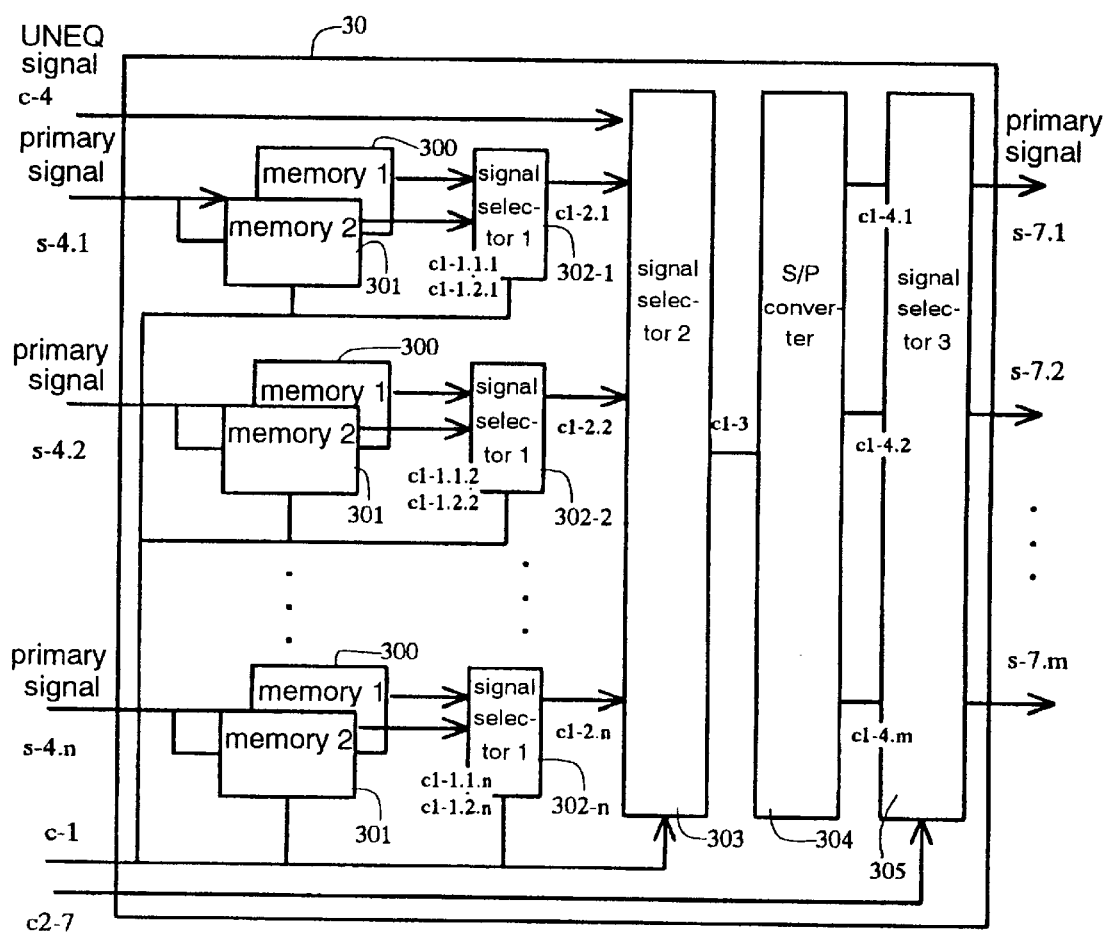
FIG. 11 is a block diagram illustrating a further example arrangement for the TSI circuit in the TSI function unit.

The TSI circuit 30 of the TSI unit 3 is generally constituted as is shown in FIG. 8, or in FIG. 9 to FIG. 11. The arrangement shown in FIG. 8 is employed to perform general processing for a primary signal upon receipt of an input signal s-4. The arrangements in FIGS. 9 through 11 are used to divide a primary signal and to store the divided signals in several memories for processing.

In FIG. 8, the TSI circuit 30 is constituted by two memories 300 and 301 and a signal selector 302. A primary signal s-4 is stored in the two memories 300 and 301, and in accordance with a control signal c-1 from the signal selector 302, it is output as a control signal s-7 in a sequential order that differs from the order in which it was written.

The memories 300 and 301 have sufficient memory capacity to store all of the primary signals and the ALM data received during a cycle T, and are accessible by the control signal c-1.

The primary signal s-4 that is transmitted to the TSI unit 3 is alternately written to the memories 300 and 301. The alternate writing is performed to enable random reading. The data must be read after all of it has been stored in the memories 300 and 301, so that the memories 300 and 301 can act as memories for which reading and writing are constantly performed relative to primary signals that are endlessly received.

Figure 12:
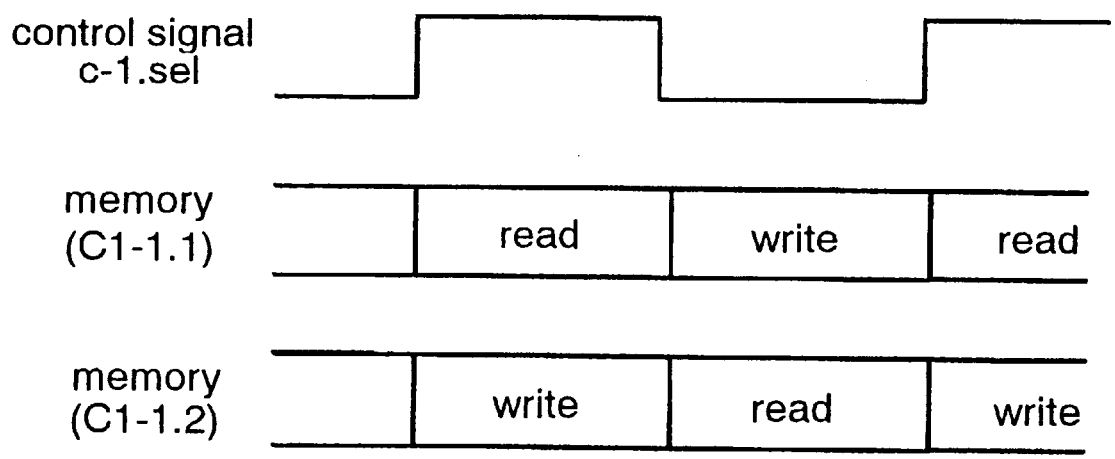
FIG. 12 is a diagram for explaining the reading of a primary signal from the TSI circuit.

More specifically, in consonance with the control signal c-1, the TSI circuit 30 alternately fetches the primary signal s-4 and reads the primary signal s-4 in a changed sequential order in the cycle of 13.89 $\mu$s, for example, as is shown in FIG. 12. In response to the control signal c-1, the signal selector 302 selects one of signals c1-1.1 and c1-1.2 that are read from the memories 300 and 301, which are prepared for reading, and outputs the selected signal as a primary signal s-7.

When the selection of the UNEQUIPPED signal is instructed in accordance with the signal c-1, an UNEQUIPPED signal c-4 is selected.

Another arrangement of the TSI circuit 30 shown in FIG. 9 is constituted by 2n memory sets 300-1 through n and 301-1 through n, n signal selectors 302-1 through n, and one signal selector 303.

In an additional arrangement shown in FIG. 10, the TSI circuit 30 has the structure in FIG. 8 for each of primary signals s-4.1 through s-4.n. In addition, a second signal selector 303 and a series/parallel converter 304 are provided.

For an arrangement shown in FIG. 11, a third signal selector 305 is provided to select a primary signal.

In the arrangement for the TSI circuit 30 in FIG. 11, and in addition to the arrangements for the TSI circuit 30 in FIG. 9, a serial/parallel converting circuit 304 is provided at the rear stage of the signal selector 303, and the signal selector 305 is provided behind the serial/parallel converting circuit 304 to switch paths in accordance with a control signal c2-7. The signal selector 305 analyzes the received signals to obtain several primary signals s-7.1 through s-7.m, which are then output.

With the arrangements for the TSI circuit 30 in Figs. 9 through 11, whereby a primary signal is stored in several memories, when the amount of read address data stored in the memory 313 in the control signal generator 31 is increased, and the speed of the read control signal c-1 is accordingly increased, the number of the primary signals s-7 relative to the TSI circuit 30 is also increased.

In FIGS. 9 through 11, the structures of the individual memory sets 300-1 through 300-n and 301-1 through 301-n are the same as those of the memories 300 and 301 in FIG. 8. These memory sets have sufficient memory capacity to store all of the primary signals s-4.n (n through n) and the ALM data received during the cycle T, and can be accessible in accordance with the control signals c-1.n.

The primary signals s-4.n (n=1 through n) are fetched. And the primary signals c1-1.1.1 to c1-1.1.n and c1-1.2.1 to c1-1.2. n are alternately read out, in the sequential order that differs from that in which they were received, in accordance with the control signal c-1.n (c-1 includes CLK signal c-1clk, and ACM data signals c-1.acm1, c-1.acm2 and c-1.sel from the control signal generator, as will be described later).

When the selection of an UNEQUIPPED signal is instructed by the control signal c-1, an UNEQUIPPED signal c-4 is selected.

The signal selectors 302-1 through 302-n receive primary signals c1-1.1.1 through c1-1.1.n and c1-1.2.1 through c1-1.2.n from the memory sets 300-1 through 300-n and 301-1 through 301-n, and select the signals that are ready to be read in accordance with the control signal c-1.sel from the control signal generator 31 (see FIG. 5).

The signal selector 303 selects a signal from the primary signals c1-2.1 though c1-2.n, from the signal selectors 302-1 through 302-n, in accordance with the control signal c-1.sel2 received from the control signal generator 31, which will be described later. The selected signal is output as a primary signal s-7.

The control signal generator 31 of the TSI unit 3 outputs master clock signals s-6.clk, c-1.clk and s-8.clk, which concern the exchange of time slots (signal exchange), and control signals c-1 (c-1.sel, c-1.acm1 and c-1.acm2), which are used to control the TSI circuit 30.

Figure 13:
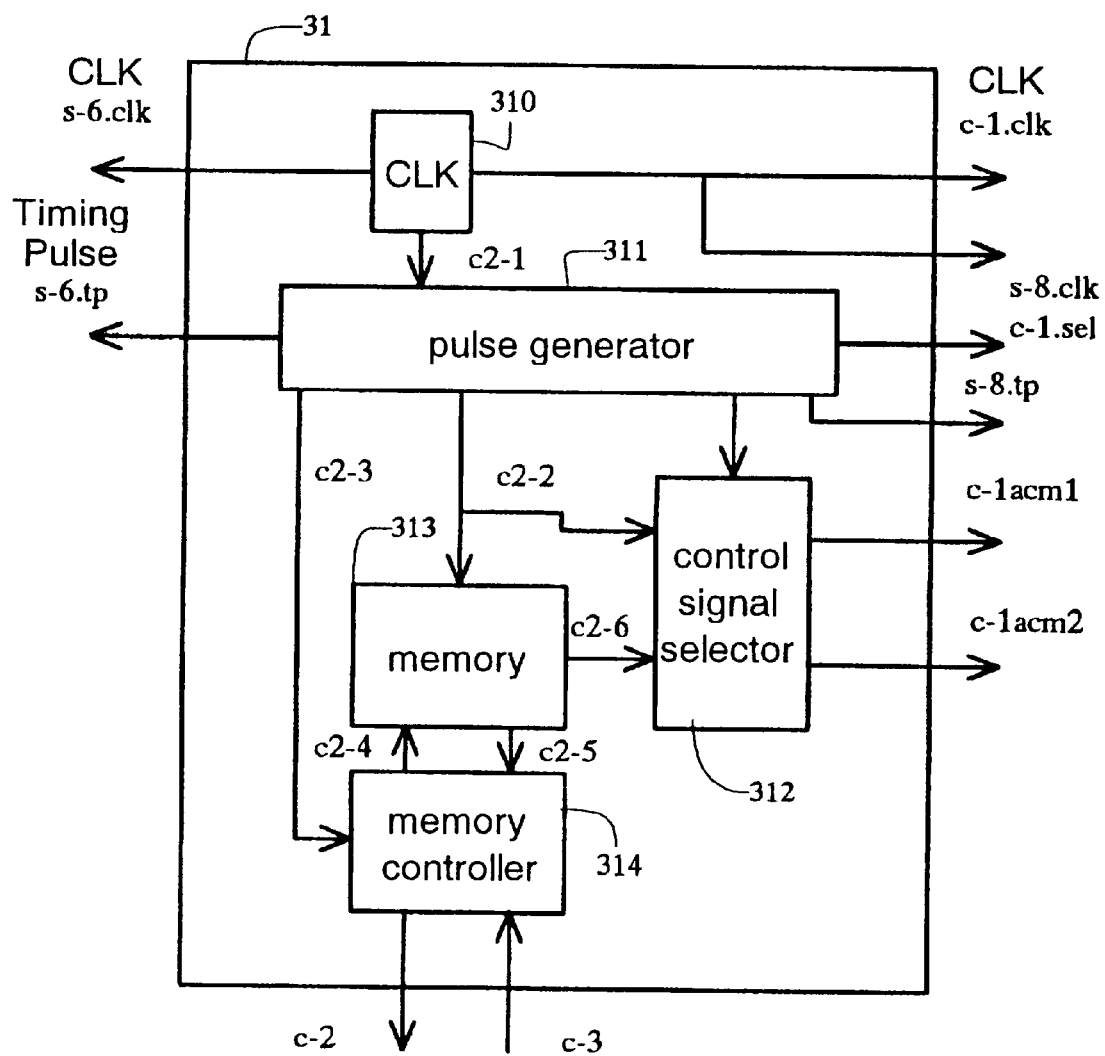
FIG. 13 is a block diagram illustrating an example of a control signal generator.

The control signal generator 31 has the arrangement shown in FIG. 13, as an example, and is used together with the TSI circuit 30 in FIG. 8. This control signal generator 31, which has no path switching function, comprises a clock (CLK) oscillator 310, a pulse generator 311, a control selector 312, a memory 313 and a memory controller 314.

The clock (CLK) oscillator 310 generates master clock signals s-6.clk, c-1.clk and c2-1 concerning the exchange of time slots (exchange of signals). The pulse generator 311 generates various timing pulse signals s-6.tp and s-8.tp, which are required for the TSI process, and a control signal c-1.sel, which is relative to the TSI circuit 30.

A data signal c2-4, which is a read address signal for the memories 300 and 301 of the TSI circuit 30, is transferred to and stored in the memory 313 by the memory controller 314. This signal is periodically output as a control signal c2-6 in accordance with a control signal c2-2 from the pulse generator 311.

The memory controller 314 fetches TSI setting data signal c-3 from the bus interface circuit 32 (see FIG. 5), and writes it into the memory 313. The memory controller 314 also outputs data signal c-2, for confirmation of a setting signal, to the bus interface circuit 32, and for confirmation, reads address data from the memory 313.

The control signal selector 312 selects either a write address signal c2-2 from pulse generator 311 or a read address signal c2-6 from the memory 313.

The write address signal c2-2, which is a count-up signal, is an address signal for sequentially writing to the memory 313. In synchronism with the repeated reading and writing relative to the memory 313, the write address signal c2-2 and the TSI control signal c2-6 are alternately selected by the control signal selector 312, and are output as control signals c-1.acm1 and c-1.acm2.

The cycle for reading/writing the memory 313 is a time period (125/9 $\mu$s) required for one row. Since the STM-1 signal has the same signal arrangement for each row, as is shown in FIG. 6, only data for one row need be fetched to adequately perform TSI.

When the signal format is restricted, data for even ¼ row enables the TSI process. Once the data has been stored in the memory they can be read at random while being output. This property is employed to implement the TSI function. As is shown in FIG. 14, for example, by comparing the memory input time with the memory output time, columns 100 and 101 are exchanged When a plurality of memories 313 are provided, they can be selected by a selector. Also, available for switching paths there are a method for selecting a memory control signal according to ALM data and a method for selecting a primary signal after the TSI.

Figure 15:
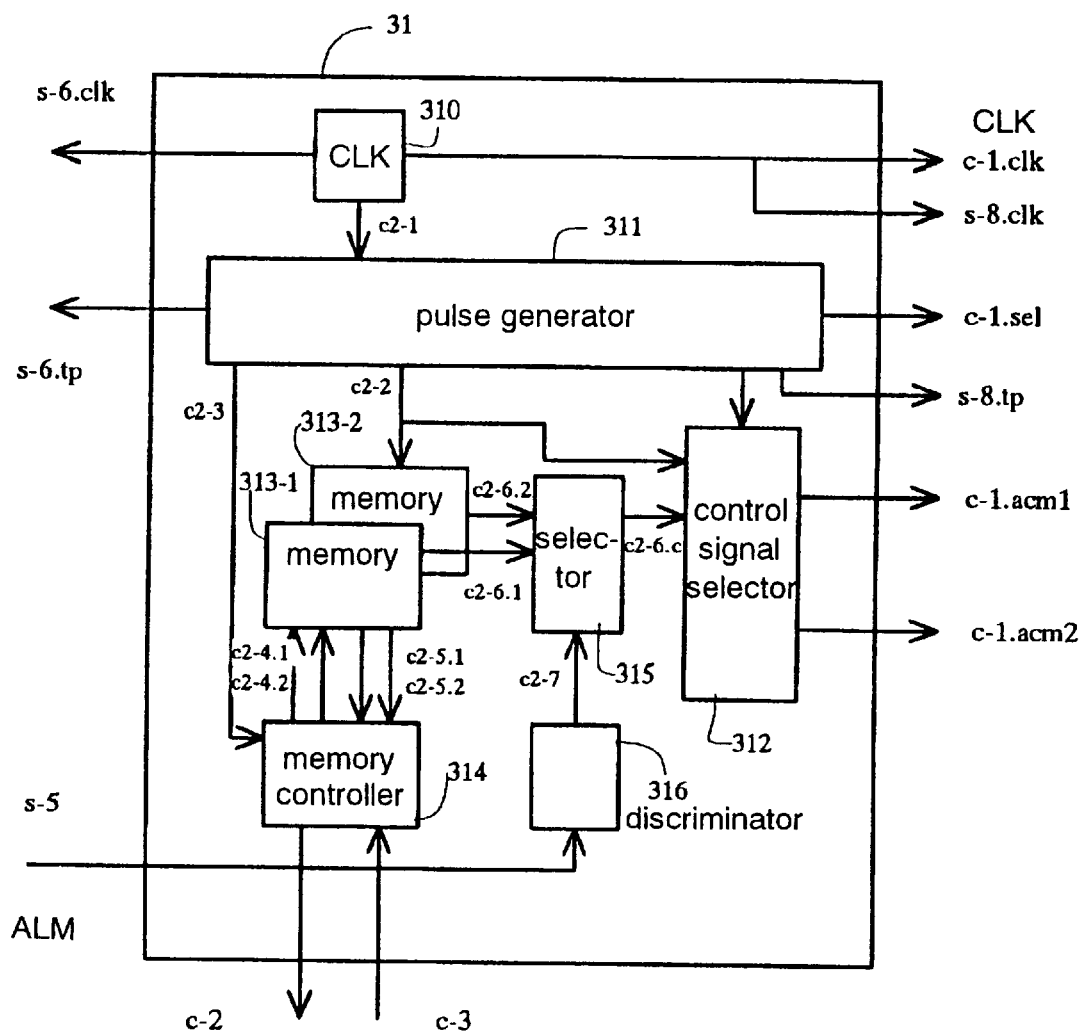
FIG. 15 is a block diagram illustrating an example arrangement of the control signal generator.

According to the method for selecting the memory control signal, data for signals to be selected when an ALM occurs are stored in advance in memories 313-1 and 313-2, as is shown in an example arrangement for the control signal generator 31 in FIG. 15.

In addition, a signal discriminator 316 and a second control signal selector 315 are provided to select one of the outputs of the memories 313-1 and 313-2 in consonance with the situation during which the ALM has occurred. Since a control signal is changed in consonance with the situation during which the ALM has occurred, a primary signal is accordingly altered.

The example of the control signal generator 31 in FIG. 15 corresponds to the TSI circuit 30 in FIG. 8, but has a path switching function. The control signal generator 31 comprises a CLK oscillator 310, a pulse generator 311, a control signal selector 312, memories 313-1 and 313-2, a memory controller 314 and a signal discriminator 316.

The control signal generator 31 generates master clock signals (CLKS) s-6.clk, c-1.clk and s-8.clk concerning cross connections (signal exchanges). Further, the control signal generator 31 outputs timing pulse signals s-6.tp and s-8.tp for controlling the block timing, and control signals c-1 (c-1.sel, c-1.acm1 and c-1.acm2) for controlling the TSI circuit 30.

The difference between this arrangement and the arrangement for the control signal generator 31 in FIG. 13 is that an ALM data signal s-5 is received, and in accordance with this, the contents of the control signals c-1.acm1 and c-1.acm2 for controlling the memories 300 and 301 of the TSI circuit 30 are changed.

Moreover, in FIG. 15, in addition with the arrangement of the TSI circuit 30 in FIG. 8, data signals c2-4.1 and c2-4.2, which serve as read address signals for the memories 300 and 301, are transferred to and stored in the memories 313-1 and 313-2 by the memory controller 314. These signals are periodically output in accordance with the control signal c2-2 from the pulse generator 311.

In FIG. 15, as the number of the memories corresponding to those in the TSI circuit 30 is increased, signals output from the memory controller 314 are increased to c2-4.1 and c2-4.2, and input signals are increased to c2-5.1 and c2-5.2.

The signal discriminator 316 outputs a selection signal for selecting one of the memories 313-1 and 313-2 based on a line ALM signal s-5 from the signal synchronizer 2. The control signal selector 312 selects one of the read address signals output from the memories 313-1 and 313-2 in consonance with the control signal c2-7 from the signal discriminator 316.

According to the arrangement in FIG. 15, the control signal selector 312 selects the write address signal c2-2 output from the pulse generator 311 and the signal c2-6.c output from the selector 315.

Figure 16:
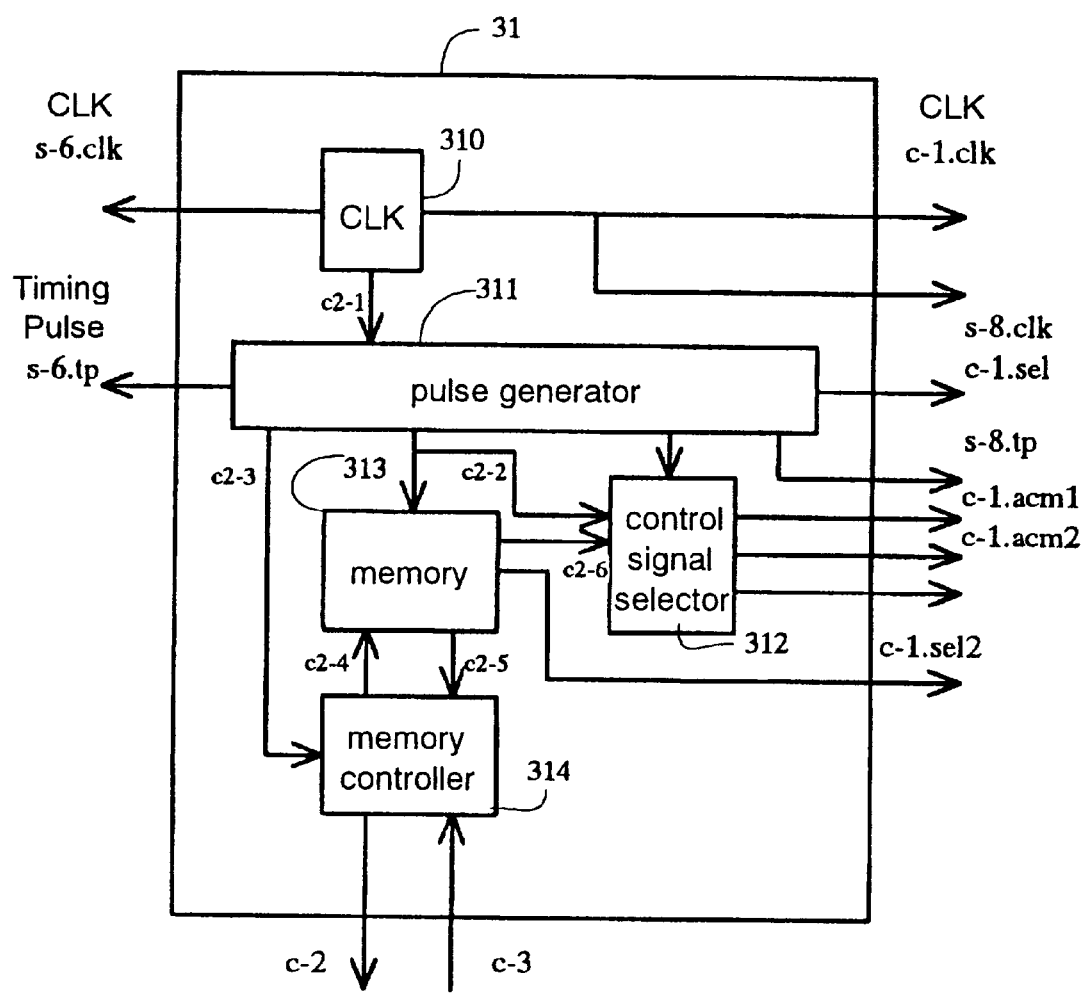
FIG. 16 is a block diagram illustrating an example arrangement of the control signal generator corresponding to FIG. 9.

In FIG. 16 is shown a control signal generator 31 corresponding to FIG. 9. This control signal generator 31 does not have the path switching function, and includes a CLK oscillator 310, a pulse generator 311, a control signal selector 312, a memory 313 and a memory controller 314.

The control signal generator 31 in FIG. 16 generates master clock signals (CLKS) s-6.clk, c-1.clk and s-8.clk concerning the exchange of the time slots (signal exchange). The control signal generator 31 also outputs timing pulse signals s-6.tp and s-8.tp for controlling the timing for blocks, and also control signals c-1 (c-1.sel, c-1.acm1, c-1.acm2 and c-1.sel2) for controlling the TSI circuit 30.

A data signal c2-4, which serves as a read address signal for the memories 300 and 301, is transferred and stored in the memory 313 by the memory controller 314, and is periodically output as a control signal c2-6 in consonance with a control signal c2-2 from the pulse generator 311. When this signal is used by the TSI circuit 30 in FIG. 9, the signal c-1.sel2 for controlling the signal selector 303 of the TSI circuit 30 is also output.

Figure 17:
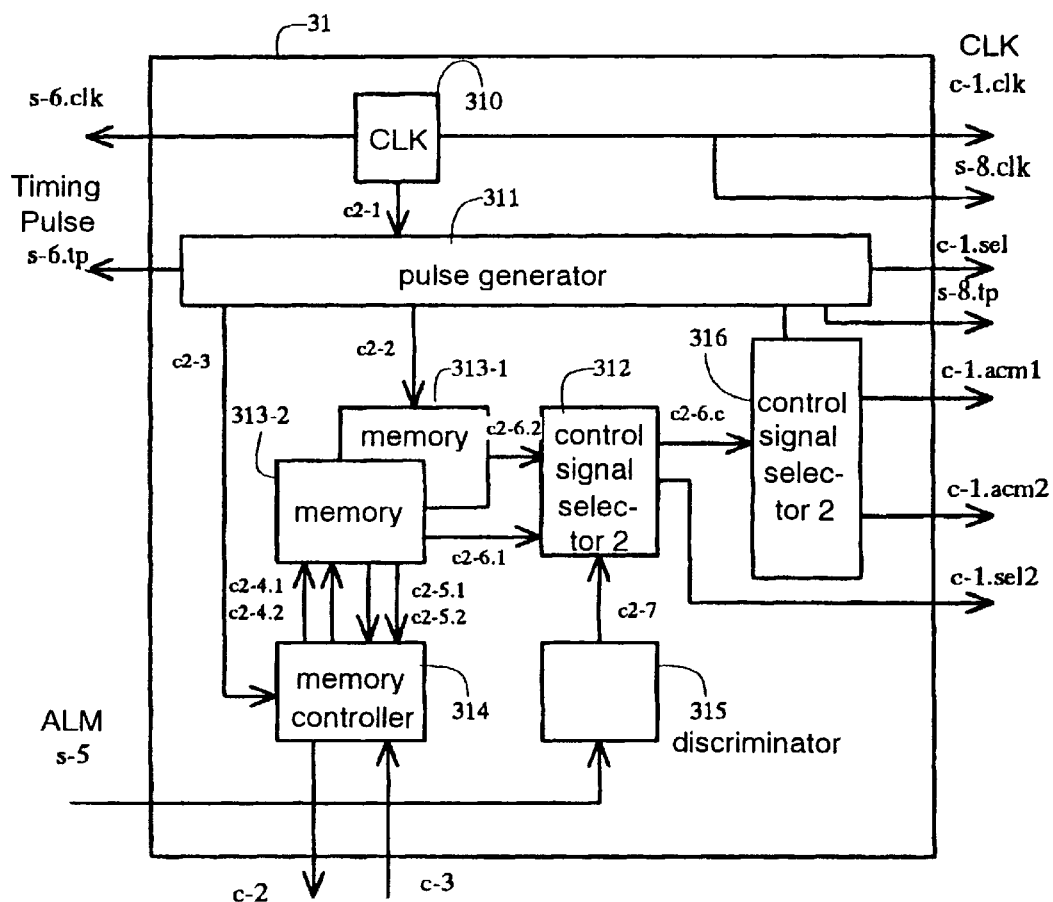
FIG. 17 is a block diagram illustrating another example of the control signal generator.

A control signal generator 31 having the arrangement in FIG. 17 corresponds to the TSI circuit 30 in FIG. 9, but has the path switching function. The control signal generator 31 in FIG. 17 includes a CLK oscillator 310, a pulse generator 311, a control signal selector 316, memories 313-1 and 313-2, a memory controller 314, a signal discriminator 315 and a control signal selector 312.

The control signal generator 31 in FIG. 17 generates clock signals (CLKS) s-6.clk, c-1.clk and s-8.clk, which are master clocks related to signal exchange, also outputs timing pulse signals s-6.tp and s-8.tp for controlling the timings of blocks.

The control signal generator 31 also outputs control signals c-1 (c-1.sel, c-1.acm1, c-1.acm2 and c-1.sel2) for controlling the TSI circuit 30.

The difference between this generator and the control signal generator 31 in FIG. 16 is that an ALM data signal s-5 is received, and in accordance with this data, the contents of the control signals c-1.acm1, c-1.acm2 and c-1.sel2 for controlling the memories 300 and 301 of the TSI circuit 30 are changed.

Figure 18:
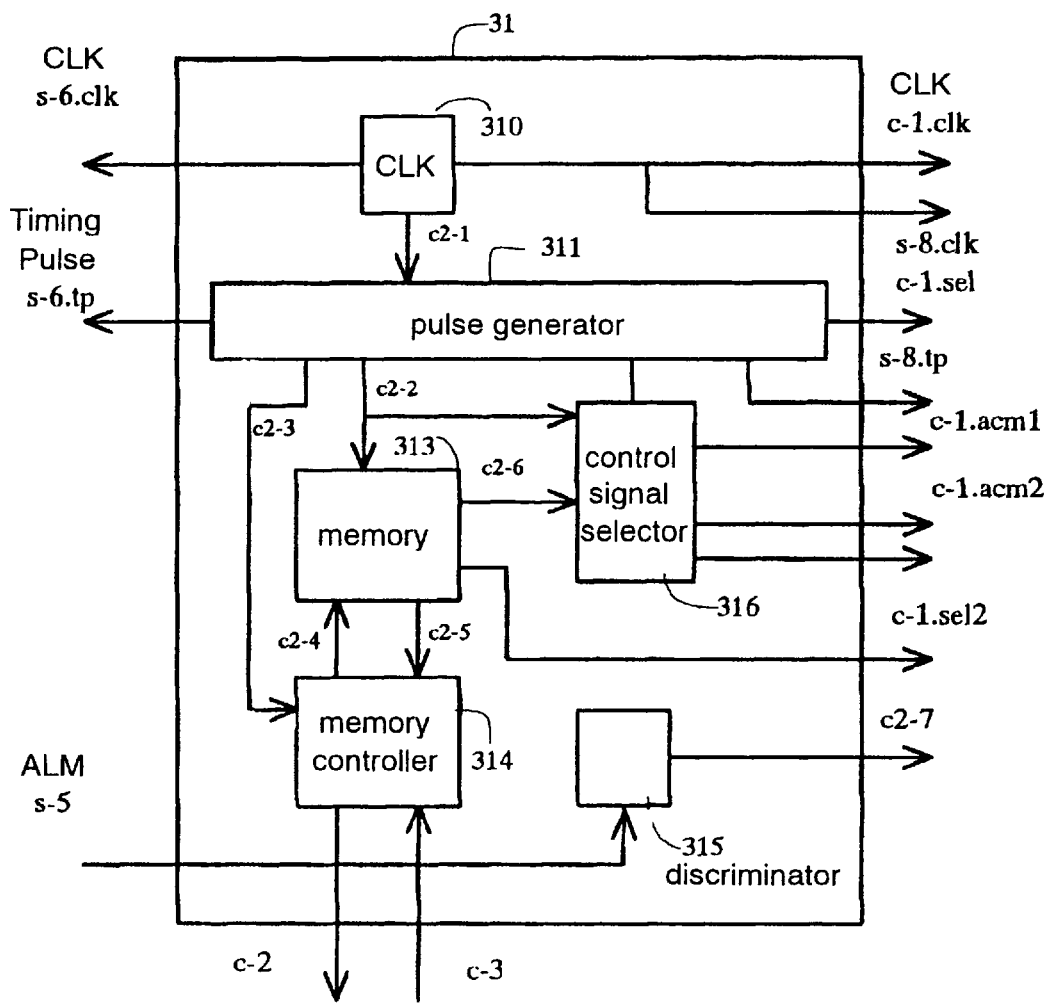
FIG. 18 is a diagram illustrating one example of the control signal generator corresponding to the TSI circuit in FIG. 11.

In FIG. 18 is shown an example control signal generator that corresponds to the TSI circuit 30 in FIG. 11. In addition to the arrangement shown in FIG. 16, a signal discriminator 315 is provided to receive an ALM data signal s-5 and output a control signal c2-7.

Figure 19:
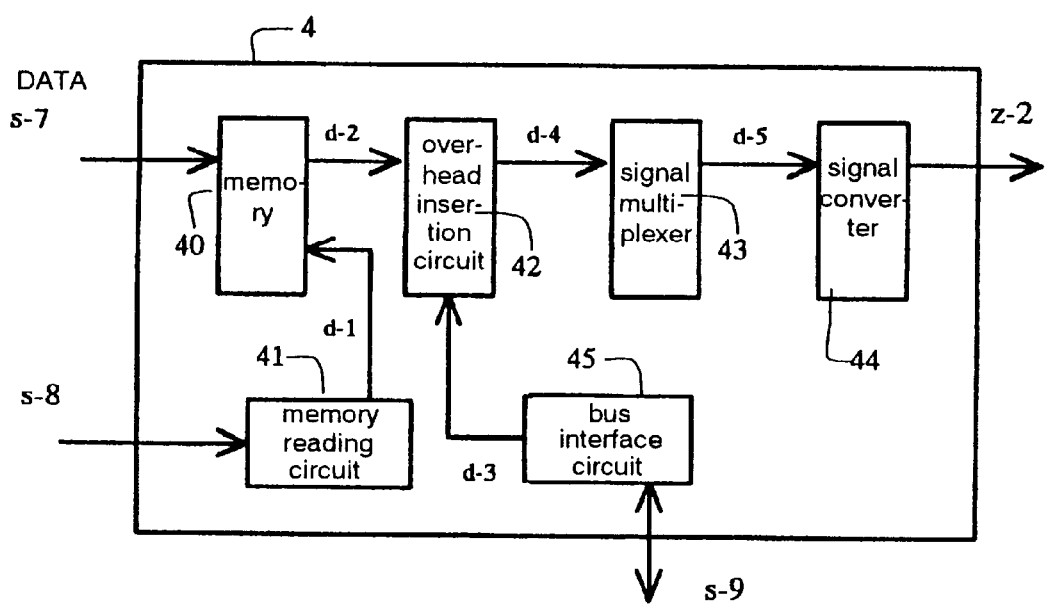
FIG. 19 is a block diagram illustrating an example arrangement of a transmission signal generator.

4) Transmission signal generator 4:

FIG. 19 is a diagram illustrating an example arrangement for the transmission signal generator 4 (see FIG. 1). The transmission signal generator 4 comprises a memory circuit 40, a memory reading circuit 41, an overhead byte insertion circuit 42, a signal multiplexer 43, a signal converter 44 and a bus interface circuit 45.

The transmission signal generator 4 receives a primary signal s-7, a clock signal s-8.clk and a timing pulse signal s-8.tp from the TSI unit 3 and converts them into an optical signal z-2, which is then output.

At this time, the transmission signal generator 4 fetches overhead data from the user interface unit 5 via the bus interface s-9, and inserts it into the primary signal s-7.

The memory circuit 40 fetches and stores the primary signal s-7 input by the TSI unit 3. Further, in accordance with a read clock signal d-1 from the memory reading circuit 41, the memory circuit 40 outputs the stored data.

The memory reading circuit 41 receives the clock signal s-8.clk and the timing pulse signal s-8.tp from the TSI unit 3, and outputs the read clock signal d-1 for controlling the reading of the memory circuit 40.

The overhead byte insertion circuit 42 fetches a primary signal d-2 read from the memory circuit 40, and inserts overhead data into a predetermined time slot. At this time, the overhead byte insertion circuit 42 also fetches overhead data d-3 from the bus interface circuit 45, and inserts it into the predetermined time slot.

The signal multiplexer 43 performs serial/parallel conversion of a primary signal d-4 received from the overhead byte insertion circuit 42 so as to obtain a suitable signal form for the signal converter 44. At this time, the signal multiplexer 43 also performs a coding process, such as scrambling.

The signal converter 44, which has the electrical to optical signal conversion function, converts a primary signal d-5 from the signal multiplexer 43 into an optical signal z-2 e.g., STM-1 signal, which is output.

The bus interface circuit 45 is connected to the user interface unit 5 by a bus for the transmission of overhead data signal d-3 that is designated by a user for the overhead byte insertion circuit 42.

Instead of being as an electrical to optical signal converter, the signal converter 44 can be an output circuit for outputting a bipolar signal, which is an electrical signal.

The signal converter 44, which functions as an output circuit for a bipolar signal, outputs a signal from the signal multiplexer 43 as, for example, an electrical signal of 140 Mbps.

The primary signal output by the TSI unit 3 is transferred to the memory 40 in the signal generator 4. This occurs because the primary signal is changed to a clock signal source that differs from that of the CLK oscillator 310 of the TSI unit 3 but is synchronized with the CLK oscillator 310.

At this time, an AU-4 pointer is replaced. Further, the overhead data is inserted into a specific position in the primary signal by the overhead byte insertion circuit 42. Also inserted is the data for a client setup, which is received from the bus interface circuit 45 that is connected to the user interface unit 5.

Following this, serial/parallel conversion is performed for the primary signal to acquire the form of a signal that is appropriate for the signal converter 44. At this time, coding (scrambling) of the primary signal, disabling of parity, and the insertion of a B1 Byte, etc., are also performed.

Finally, the resultant signal is converted into an optical signal z-2 by the signal converter 44, and the optical signal z-2 is output.

5) User interface function:

The functions of the user interface unit 5 are the processing of ALM data for a received primary signal, the display of performance data and overhead data on a display or a terminal, the calculation by a computation circuit of line data for client setup, the transmission of the result to the TSI unit 3 by using a bus signal, and the transmission of the overhead data for client setup to the signal generator 4.

More specifically, the user interface unit 5 performs an intermediate process for transmission the setting performed by a user to the signal receiver 1, the TSI unit 3 or the signal generator 4 across the bus s-9, or for displaying the state (ALM, etc.) of a received primary signal and the overhead data included in that signal.

Figure 20:
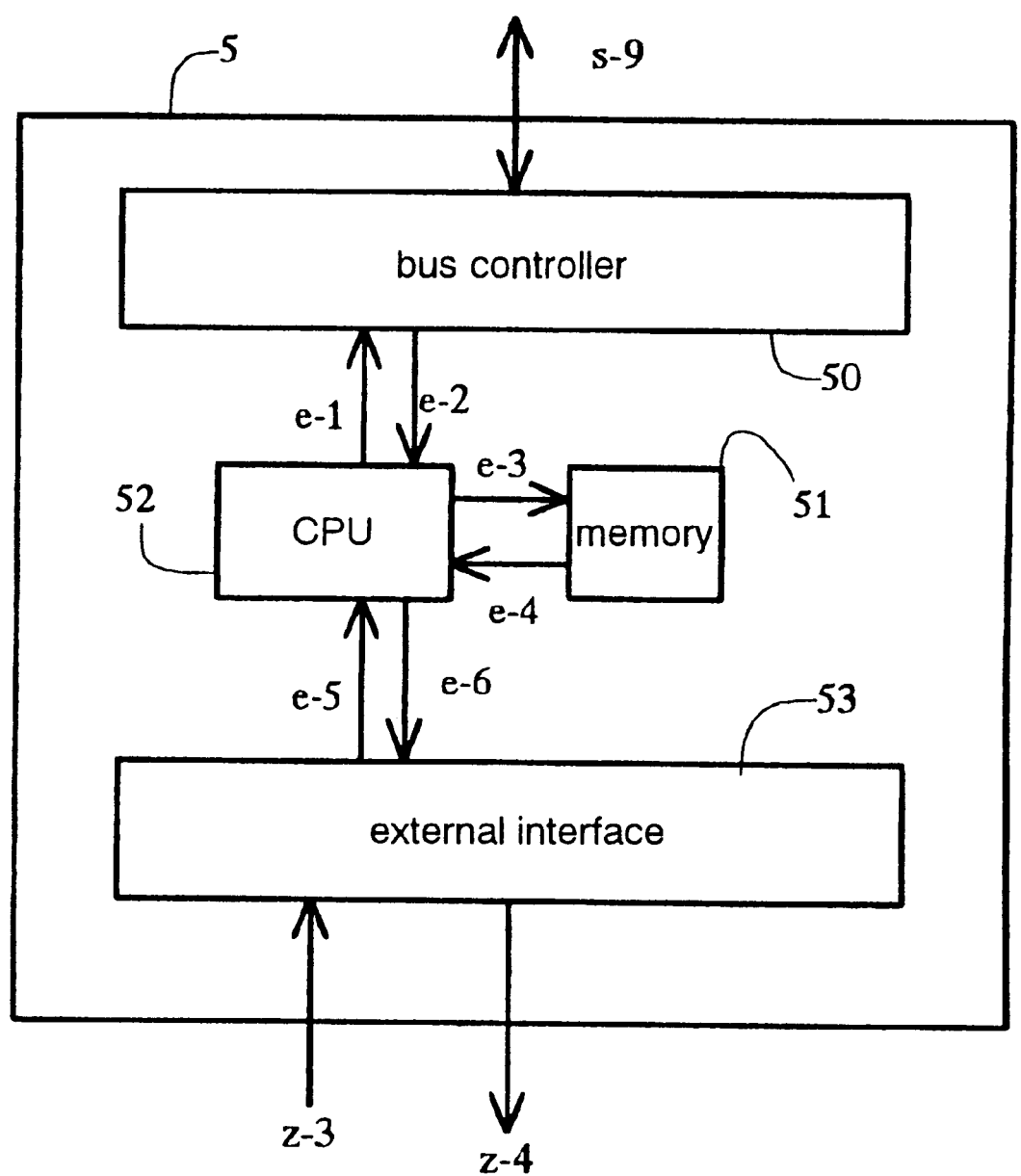
FIG. 20 is a block diagram illustrating one user interface.

An example of the user interface unit 5 is shown in FIG. 20. The user interface unit 5 comprises a bus controller 50, a memory 51, a CPU 52 and an external interface circuit 53.

The bus controller 50 is connected to the signal input processor 1, the TSI unit 3 or the bus interface circuit of the signal generator 4 across the bus s-9 for the exchange of ALM data and overhead data.

In the memory 51 are stored line setting data designated by a user, ALM data collected on the overhead or the input signal processor 1, and temporary data used by the CPU 52 for computation.

The CPU 52 is connected to the bus controller 50, the memory 51 and the external interface circuit 53, and changes the format of the input/output data by performing computation.

The external interface circuit 53 has interface ports for various devices e.g., a display device, a keyboard and a portable terminal to provide an interface with a user. The external interface circuit 53 transfers data from these devices to the CPU 52 and outputs various data stored in the memory 51 via the CPU 52 from the interface ports.

Figure 21:
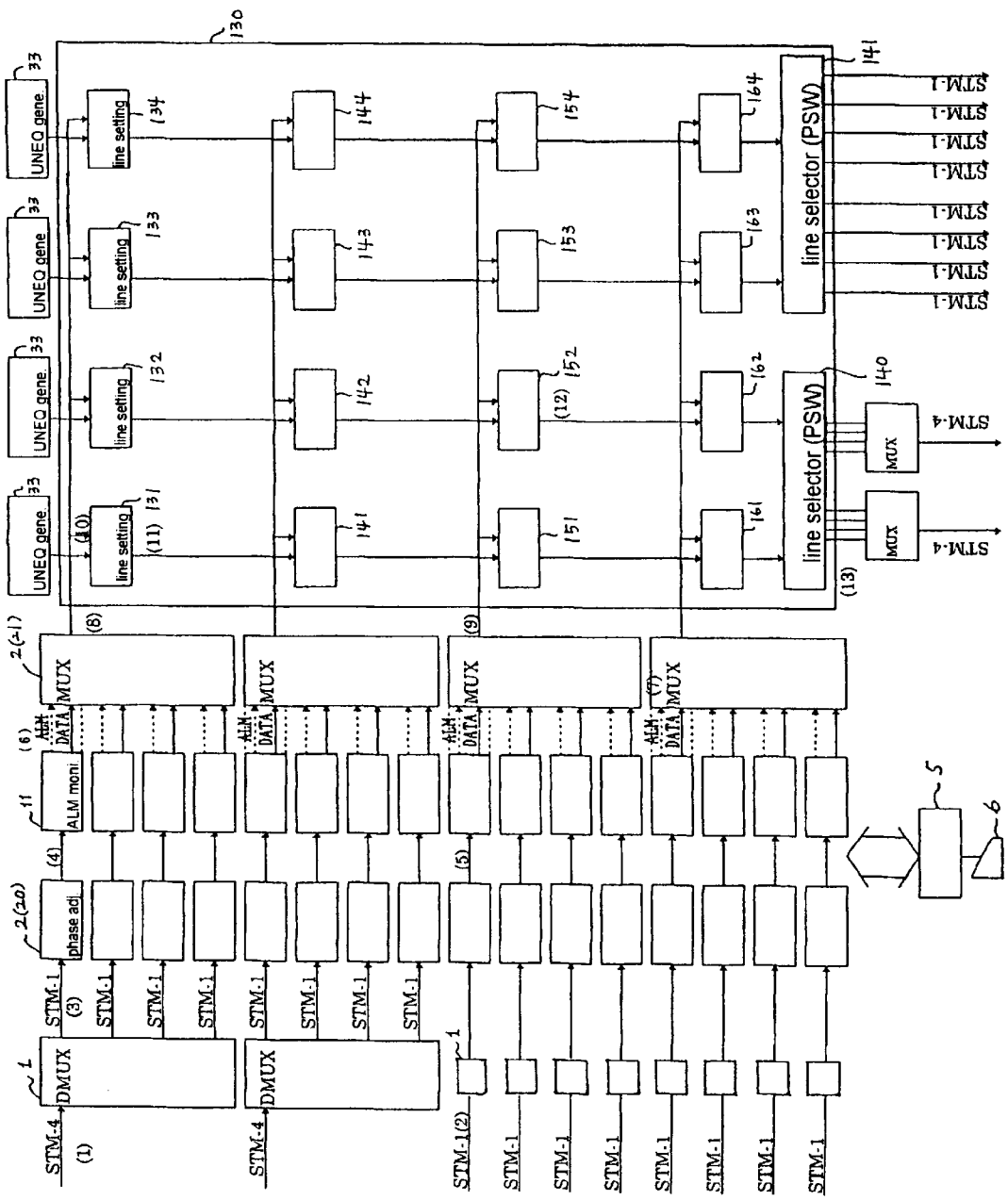
FIG. 21 is a block diagram illustrating one embodiment of the present invention for performing cross connection (line setting) with STM-4×2 lines and STM-1×8 lines as input.

FIG. 21 is a diagram illustrating one embodiment, of the present invention, described above in detail, for performing a cross connection (a line setting) while inputting STM-4×2 lines and STM-1×8 lines.

In FIG. 21, the diagrams used for the above description are partially simplified and the sequential order of the connections is changed. As is shown in FIG. 21, two STM-4 signals and eight STM-1 signals are input to a signal input processor 1, and are converted into electric signals by an optical to electrical signal converter 10 in the signal input processor 1.

The STM-1 signals are multiplexed in the STM-4 signal, and ALM processors 11 in the signal input processor 1 process ALM monitor signals by using a STM-1 level signal in common. Therefore, the STM-4 signal is divided into four STM-1 signals by a synchronizer 12 of the signal input processor 1.

Since the STM-n signals that are input to the cross connection (line setting) apparatus each have different frame timings, their time slot positions must be aligned to perform cross-connection.

Thus, the write and read timings relative to the memory 20 of the signal synchronizer 2 shown in FIG. 4 are controlled, and the frame timing positions of all the input STM-1 signals are adjusted so that they match each other.

The ALM processor 11, which processes an ALM monitor signal, monitors each channel of the ALM (alarm) state for VC-n signals that are multiplexed into each input STM-1 signal.

In consonance with the ALM state that is monitored, a signal indicating the state of each channel signal, SF (Signal fail), SD (Signal degrade) or NO-ALM, is output.

Then, Upon receipt of the primary signal data and the alarm signal, a signal converter 21 of the signal synchronizer 2 multiplexes the STM-1 signal to obtain an STM-4 signal, so that line setting is facilitated. The resultant signal STM-4 is transferred to a TSI unit 3.

A UNEQ signal generator 33 in the TSI unit 3 generates an STM-4 signal obtained by multiplexing VC-12 UNEQUIPPED signal by the equivalent of 252 channels. A TSI circuit 30 in the TSI unit 3 includes line setting circuits 131 to 164.

Figure 22:
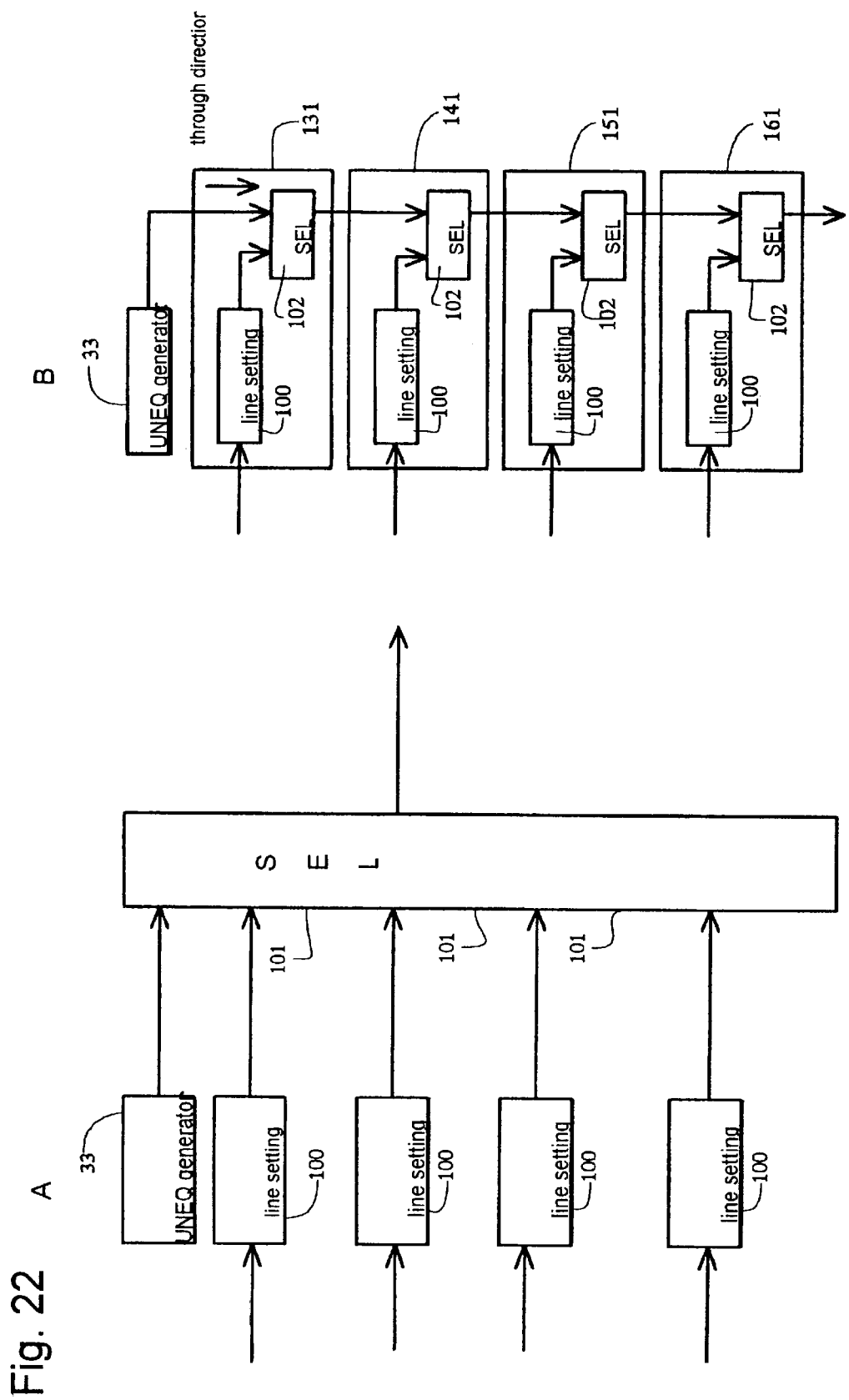
FIGS. 22A and 22B are diagrams for comparing a TSI circuit in this embodiment in FIG. 21 with the previously described TSI circuit.

When the TSI circuit 30 in the embodiment in FIG. 21 is compared with the previously described TSI circuit examples 30, this corresponds to the one specifically shown in FIGS. 22A and 22B. That is, the structure in FIG. 22A corresponds to the arrangement of the TSI circuit 30 described previously, where line setting elements 100 correspond to the assembly composed of the memories 300 and 301 and the signal selector 302. A selector 101 corresponds to the selector 303 (see FIG. 9).

The outputs of the line setting elements 100 are collectively transferred to the selector 101, which selects one of these outputs.

On the other hand, in the embodiment shown in FIG. 21, as is shown in FIG. 22B, each of the line setting elements 131 through 164, which are each constituted by a line setting element 100 and a selector 102, are cascaded.

In the embodiment in FIG. 21, a total of 16 line setting elements are provided because one set of each vertically arranged four elements implements the TSI for an STM-4 (total of four sets corresponds to an STM-16). One set of vertical elements can not implement the TSI for an STM-16 because the speed of the device is limited. Therefore, the speed is reduced to ¼, while the size of the line scale is increased four times.

The quantity of data processed by the TSI circuit 30 can be varied depending on the address speed. When the address speed is set equivalent to an STM-16, one set of the line setting elements in FIG. 21 is sufficient.

In the embodiment in FIG. 21, an arbitrary VC-n signal for an STM-4 signal received from the signal converter 21 is inserted into a through signal transferred from the UNEQ signal generator 33 or the upper-level line setting circuit. At this time, line setting is also performed for a condition signal that is added to the VC-n.

Further, line selectors (path switch: PW) 140 and 141 are provided to select one of the signals, which are cross connected by the line setting circuits 131 through 164, in consonance with the condition signals that are added to the VC-n.

For a channel for which no redundancy processing is performed, the signals are output without a selection being made. With this arrangement, since the connections of the line setting elements are increased vertically at many stages, the capacity of input signals is increased. When the connections of the line setting elements are increased horizontally at many stages, the capacity of output signals is increased. Thus, as the whole, the line setting capacity can be easily increased.

Figure 23:
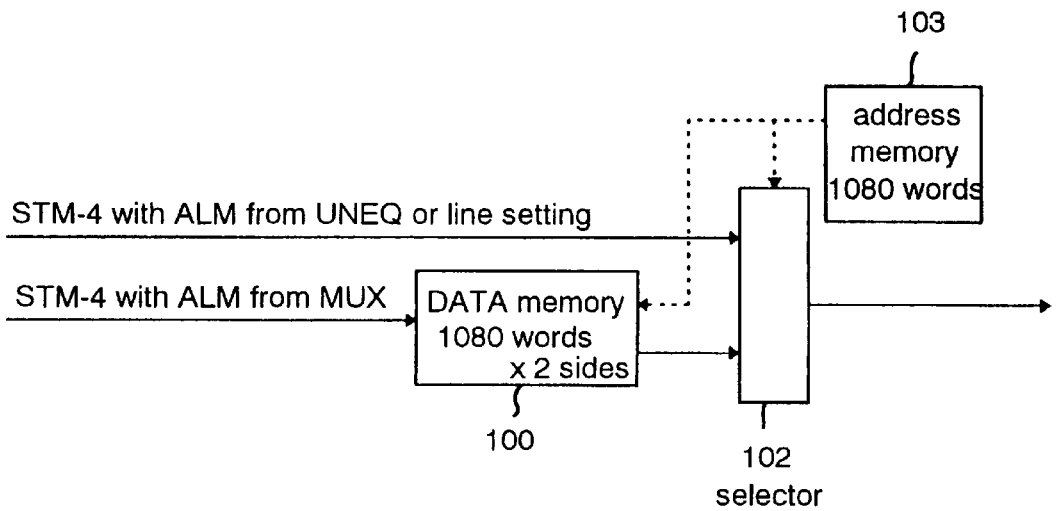
FIG. 23 is a block diagram illustrating example arrangements of line setting circuits in the embodiment in FIG. 21.

An example arrangement of each of the line setting circuits 131 through 164 in the embodiment in FIG. 21 is shown in FIG. 23. The line setting element 100 is constituted by a data memory. The data memory 100 has two sides, each having sufficient memory capacity to hold STM-4 signals for one row (125/9 μs) and a three-bit ALM signal.

Each side has a one-row memory capacity because the repeating of channels is performed for each row. While signals are written on one side, from the left in the input order, data for an immediately preceding row are written on the other side, and arbitrary data are read from the address memory 103 in consonance with an address. In this manner, the writing and the reading are changed for each row.

Input source data for each data byte in one row of signals that is to be output is held in the address memory 103. The following input source data are stored in the memory and can be rewritten externally:

(1) whether data is from a through input or is read from the data memory 100; and (2) an address for data to be read from the data memory 100.

The output of the data memory and the through data are transferred to the selector 102. In consonance with the contents of the address memory 103, either through data or the data from the data memory 100 is selected. Before this selection, the frame timing positions of both data should be matched.

Figure 24:
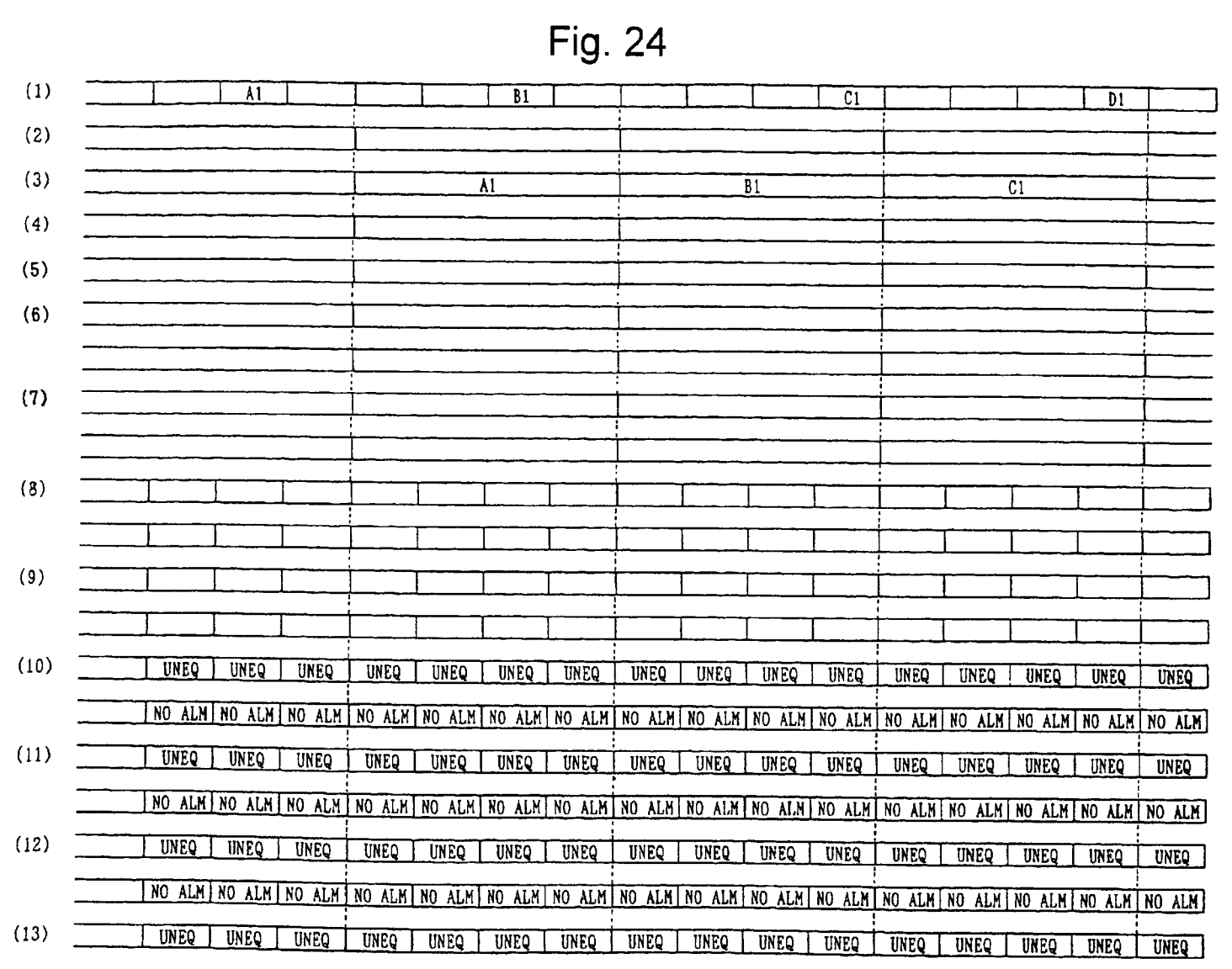
Figure 25:
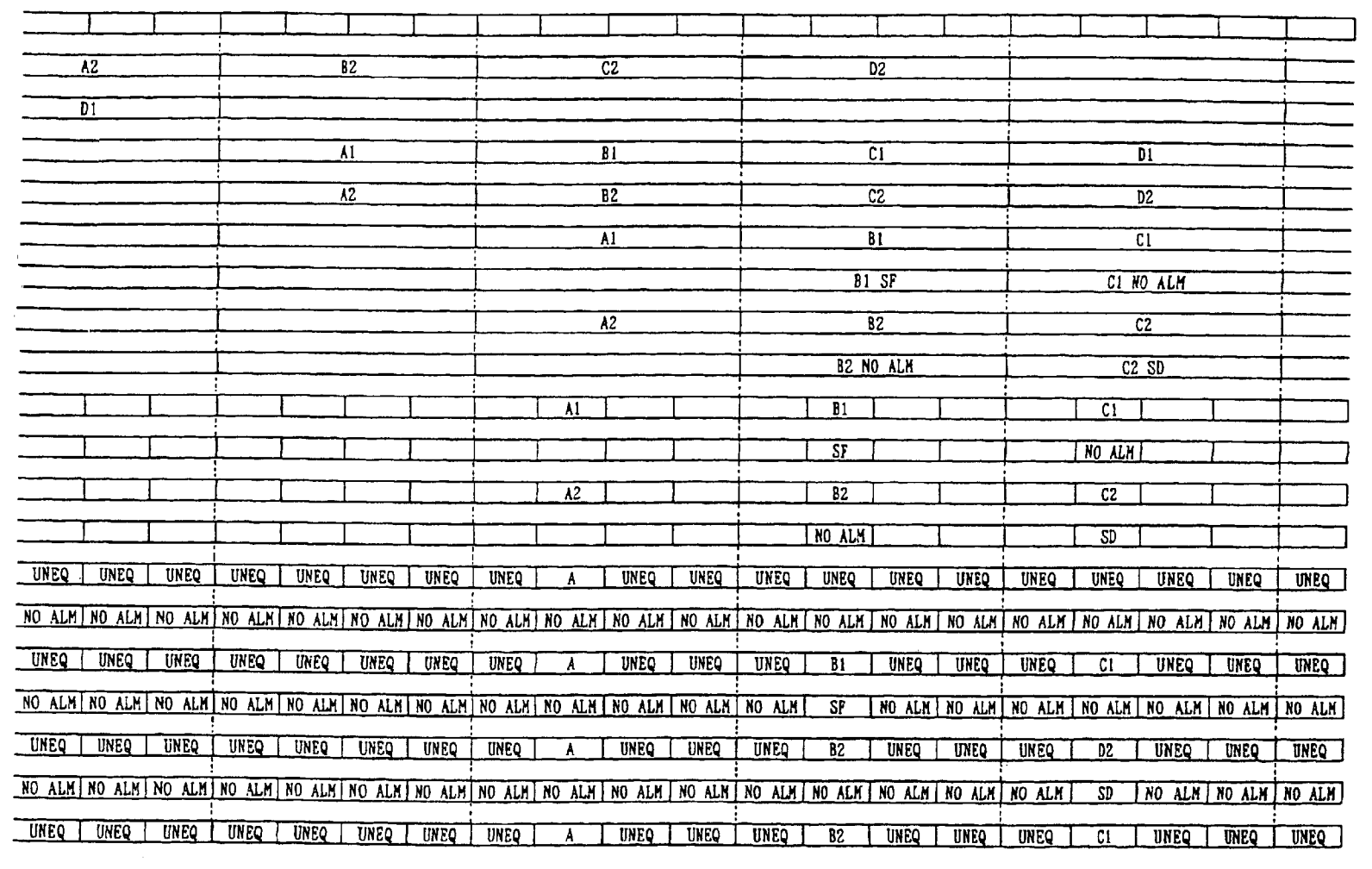

The time chart for individual signals in the embodiment in FIG. 21 is shown in FIGS. 24 and 25. Reference numerals in parentheses in FIG. 24 correspond to those in FIG. 21.

Figure 26:
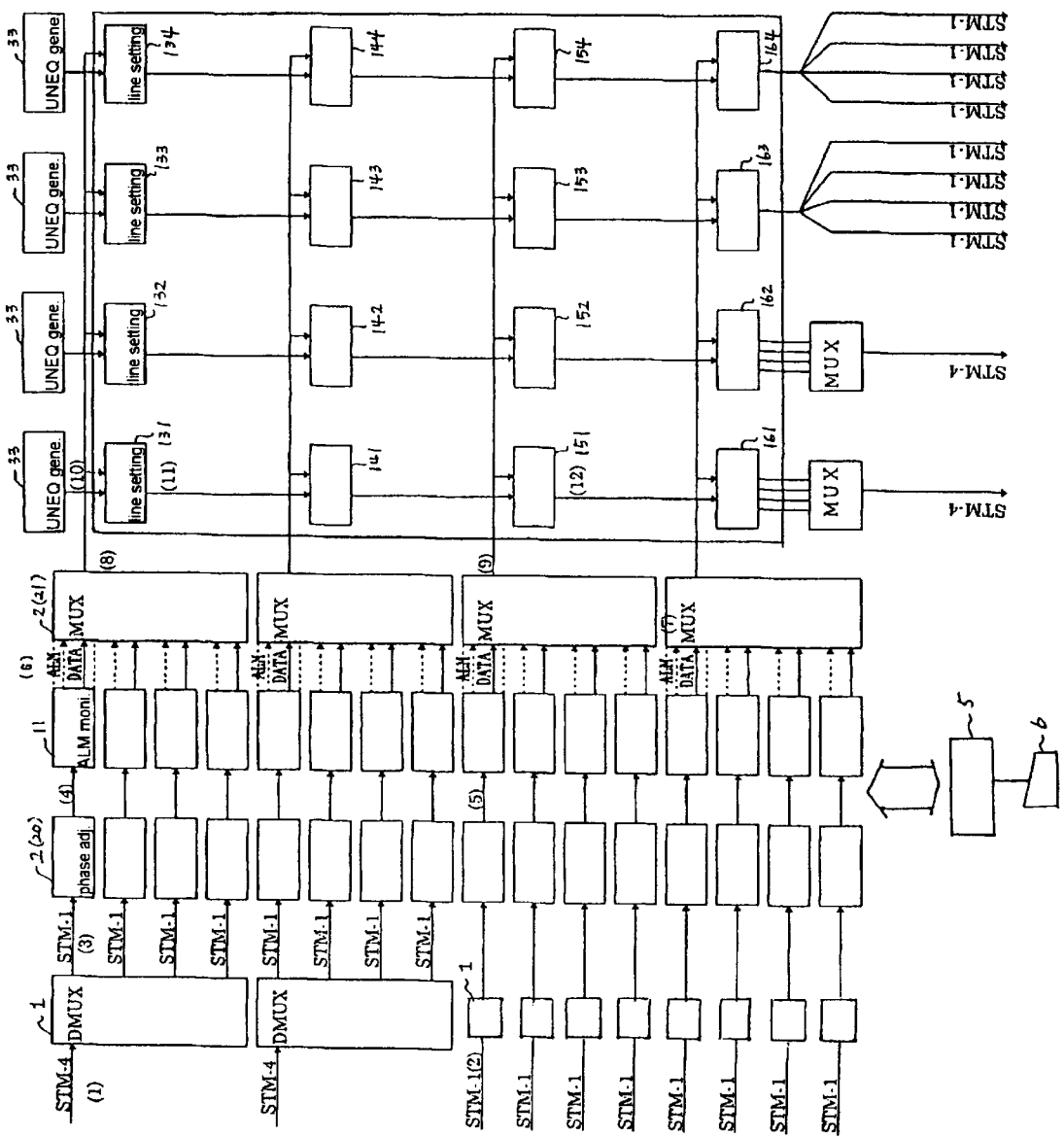
FIG. 26 is a diagram illustrating another embodiment for cross connection of STM-4×2 lines and STM-1×8 lines.

FIG. 26 is a diagram for another embodiment, which is a path switching example where a memory control signal is selected in consonance with ALM data. As well as in FIG. 21, STM-4×2 and STM-1×8 are employed as input to perform cross connections.

As is in the embodiment in FIG. 21, arbitrary VC-n of multiplexed STM-4 signals are inserted into through signals sent from the UNEQ generator or from the line setting circuits. At this time, line setting is also performed for condition signals added to the VC-n.

At a set time slot, an ALM of a signal from an upper level and an ALM of a signal to be inserted are monitored and the signal having the better quality is selected. Thus, the redundancy function can be provided.

Figure 27:
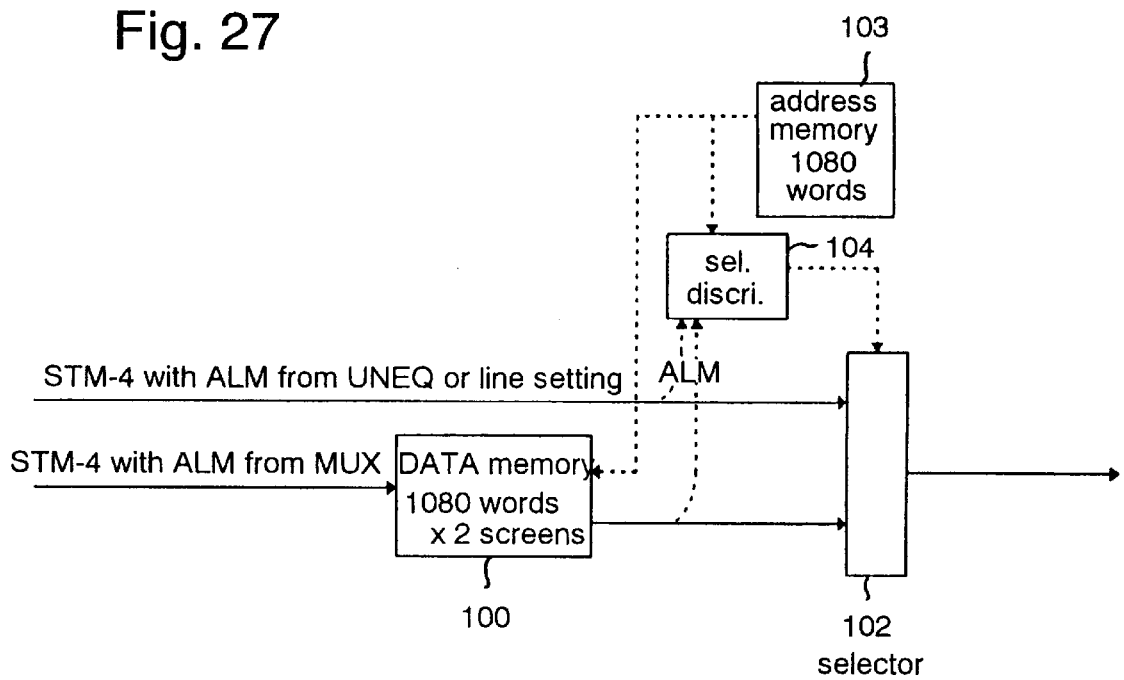
FIG. 27 is a diagram illustrating the arrangement of a line setting circuit used for the embodiment in FIG. 26.

FIG. 27 is a diagram illustrating the arrangement of a line setting circuit used for the embodiment in FIG. 26. The difference between this circuit and the line setting circuit in FIG. 23, used for the embodiment shown in FIG. 21, is that a selector discriminator 104 is provided. The selector discriminator 104 corresponds to the control signal selector 312 and the discriminator 315 (see FIG. 17, for example), both of which were previously described.

A data memory 100 has two memory sides, each having sufficient capacity to hold one row (125/9 μs) of STM-4 signals and a three-bit ALM signal.

Each side has a memory capacity sufficient for one row because the repeating of channels is performed for each row. While signals are written on one side from the left in the sequential input order, data for an immediately preceding row are written on the other side, and arbitrary data are read in consonance with an address from an address memory 103. In this manner, the writing and the reading are changed for each row.

Input source data for each data byte for one row of signals to be output, and data for determining whether redundancy processing should be performed are held in the address memory 103. The data in the memory can be rewritten externally. The following input source data are stored:

(1) whether data is from a through input or is read from the data memory 100;

(2) addresses of data to be read from the data memory 100; and (3) whether or not a time slot for that data should be redundant.

The selector discriminator 104 employs the data (1) and (3) from the address memory 103 and ALM data from the signals to determine whether the through data or data from the data memory 100 should be selected. The contents of the determination are shown in FIG. 28.

In response to the result of the determination performed by the selector discriminator 104, the selector 102 selects either the through data or the data from the data memory 100 in consonance with the contents of the address memory 103. For the selection, the frame timing positions of both data must be matched.

Figure 29:
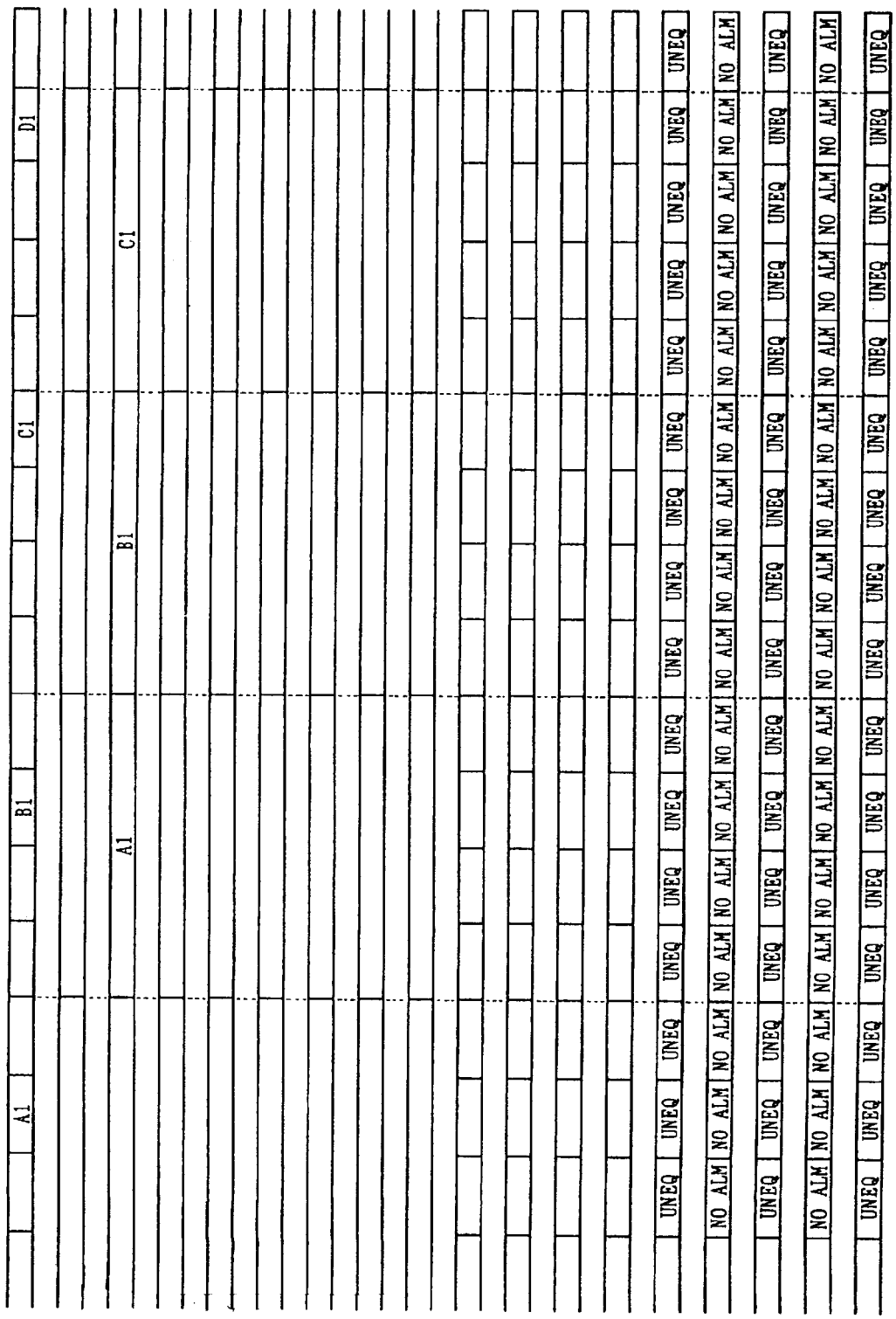
FIG. 29 is a time chart (1) for individual signals for the embodiment shown in FIG. 26.
Figure 30:
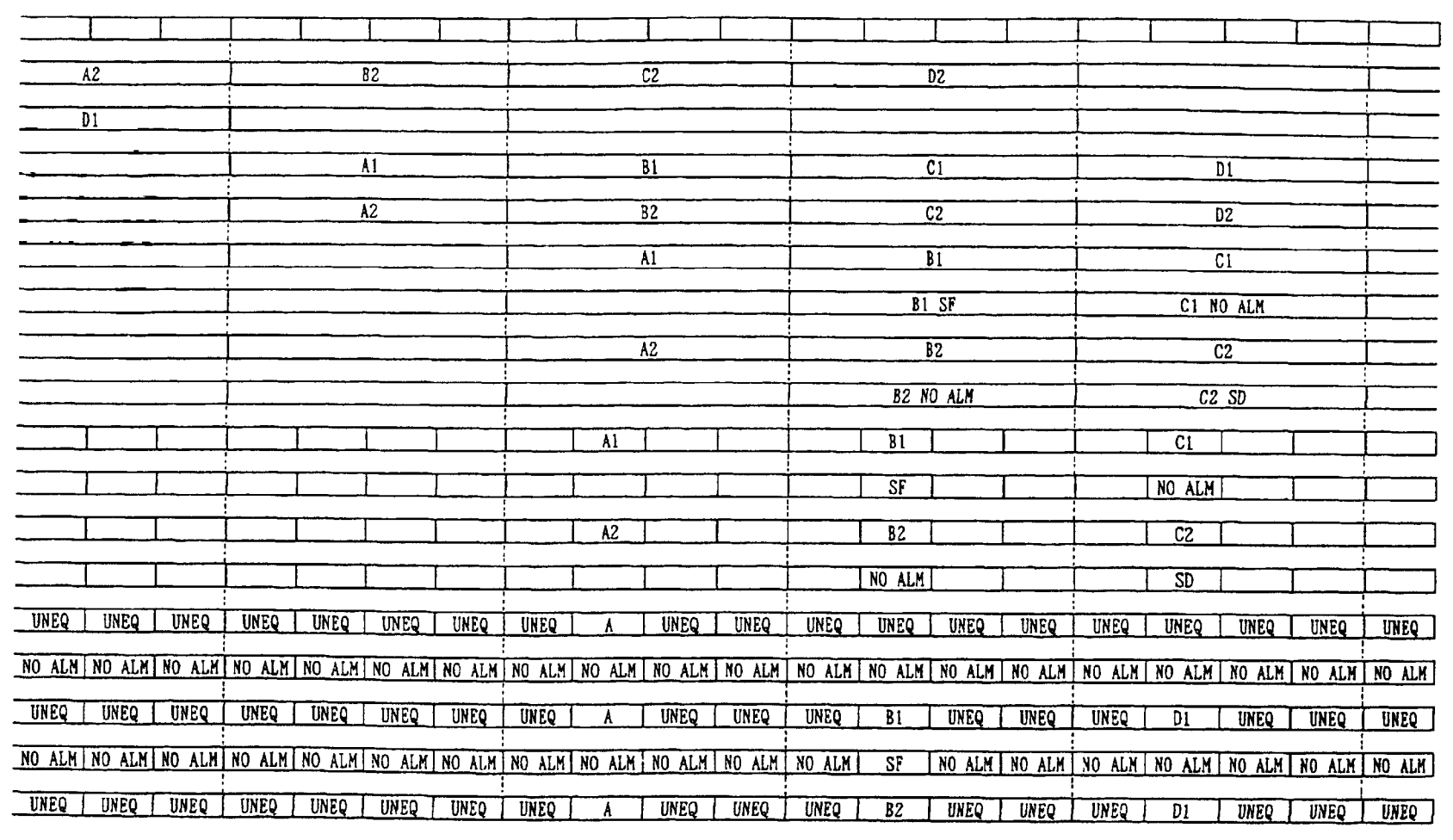

The time chart for individual signals in the embodiment in FIG. 26 is shown in FIGS. 29 and 30. Reference numerals in parentheses in FIG. 29 correspond to those in FIG. 26.

Figure 31:
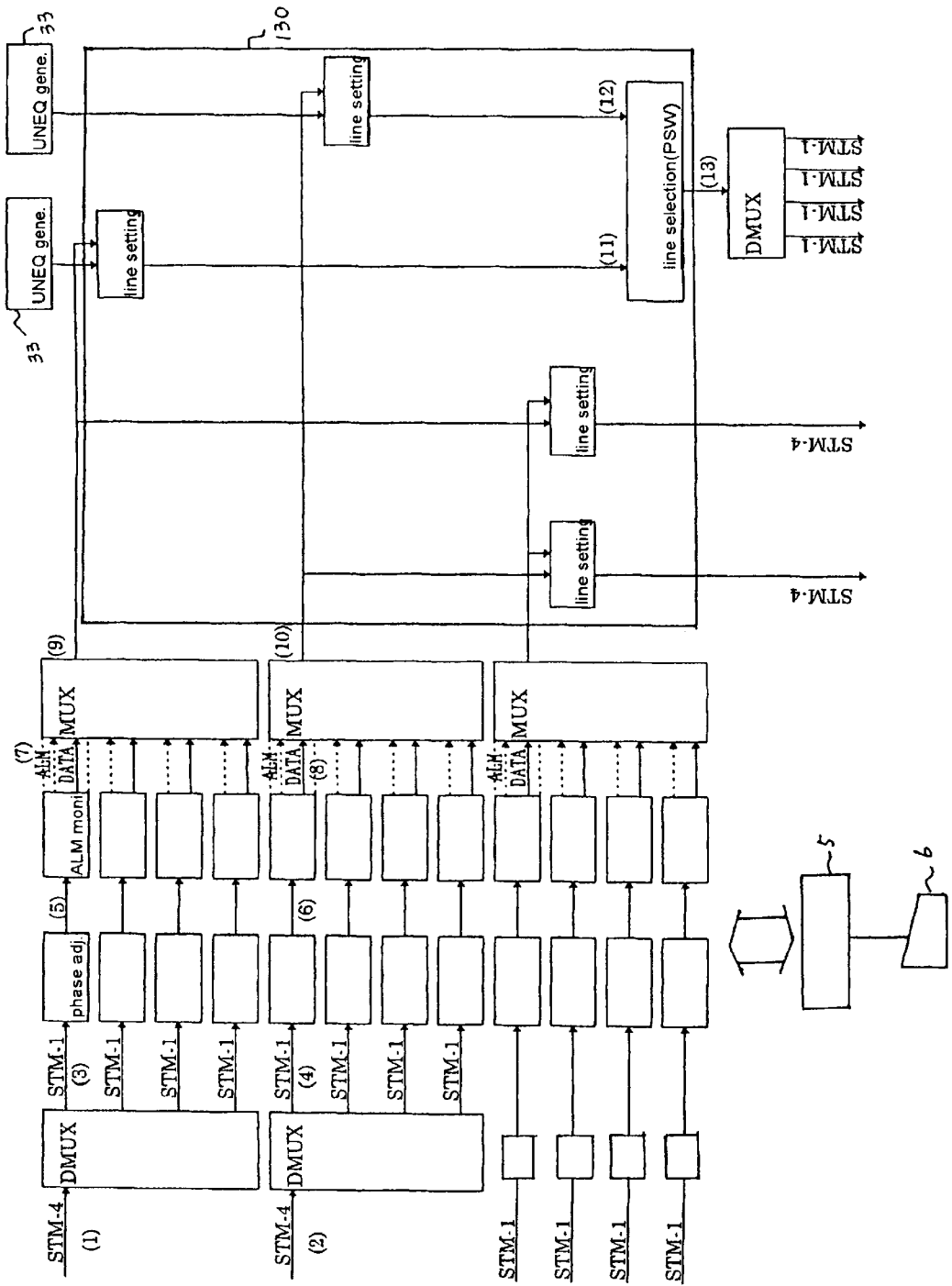
FIG. 31 is a diagram illustrating an additional embodiment where an Add/Drop multiplexer (MUX) is constituted by the line setting circuit shown in FIG. 23
Figure 34:
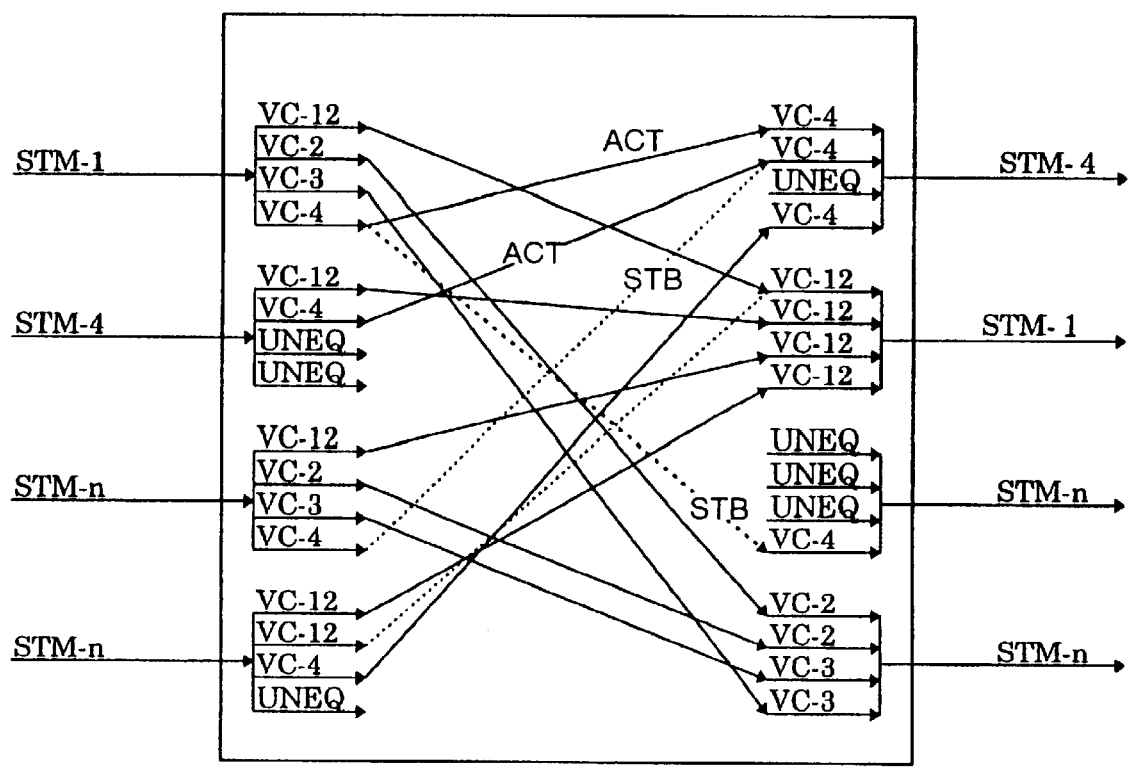
FIG. 34 is a diagram illustrating a conventional cross connection (line setting) apparatus, which serves as the center of a time-division exchange system.
Figure 35:
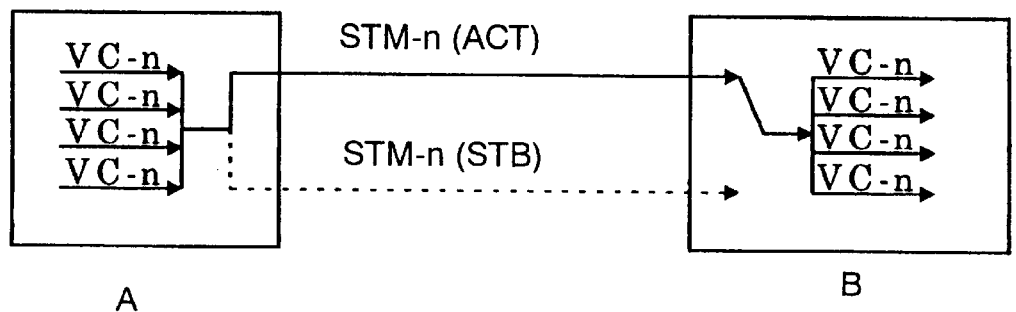
FIG. 35 is a diagram for explaining a current use/spare line redundancy method for the STM-n units.
Figure 36:
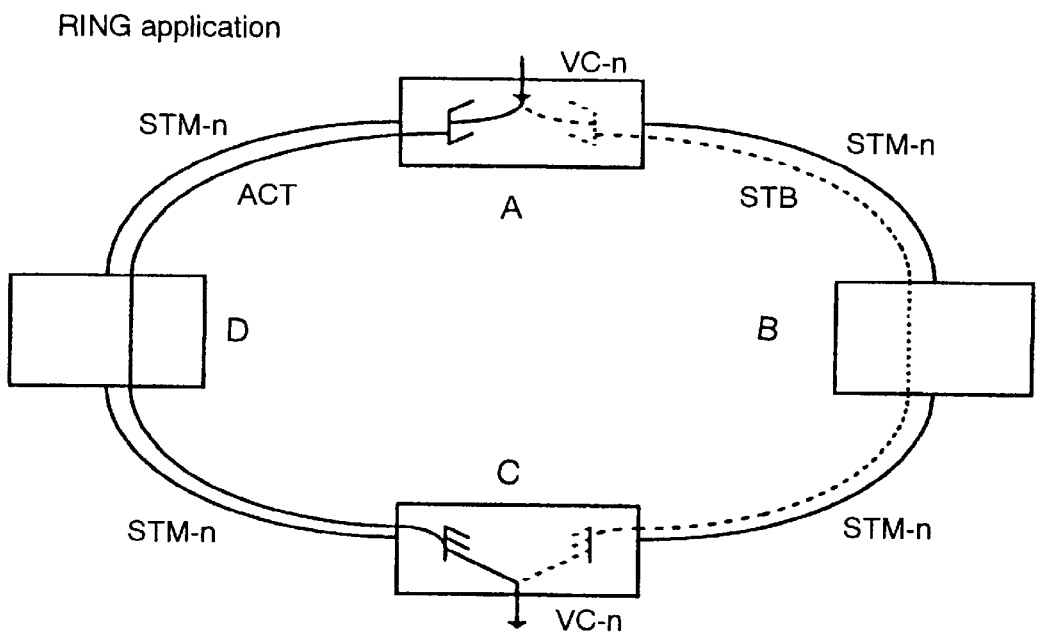
FIG. 36 is a diagram for explaining transmission devices in a ring application that have an Add/Drop multiplex line setting function.

An Add/Drop multiplexer (MUX) can be arranged as shown in FIG. 31 by using the line setting circuit in FIG. 23. The Add/Drop MUX is a multiplexer by which unidirectional low-order group of signals is interfaced, relative to a bidirectional high-order group of signals, and for which a cross connection function is limited.

Figure 32:
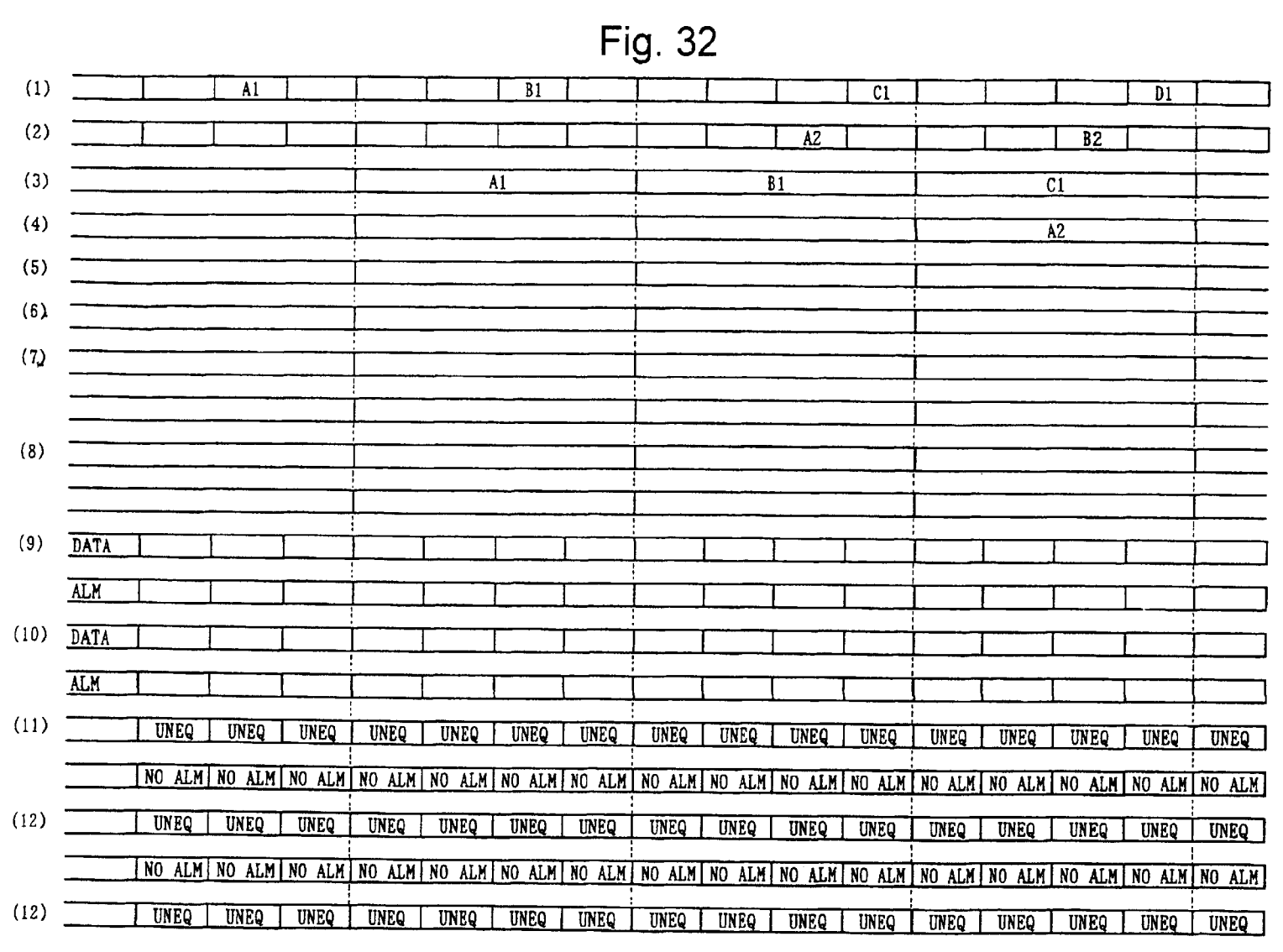
Figure 33:
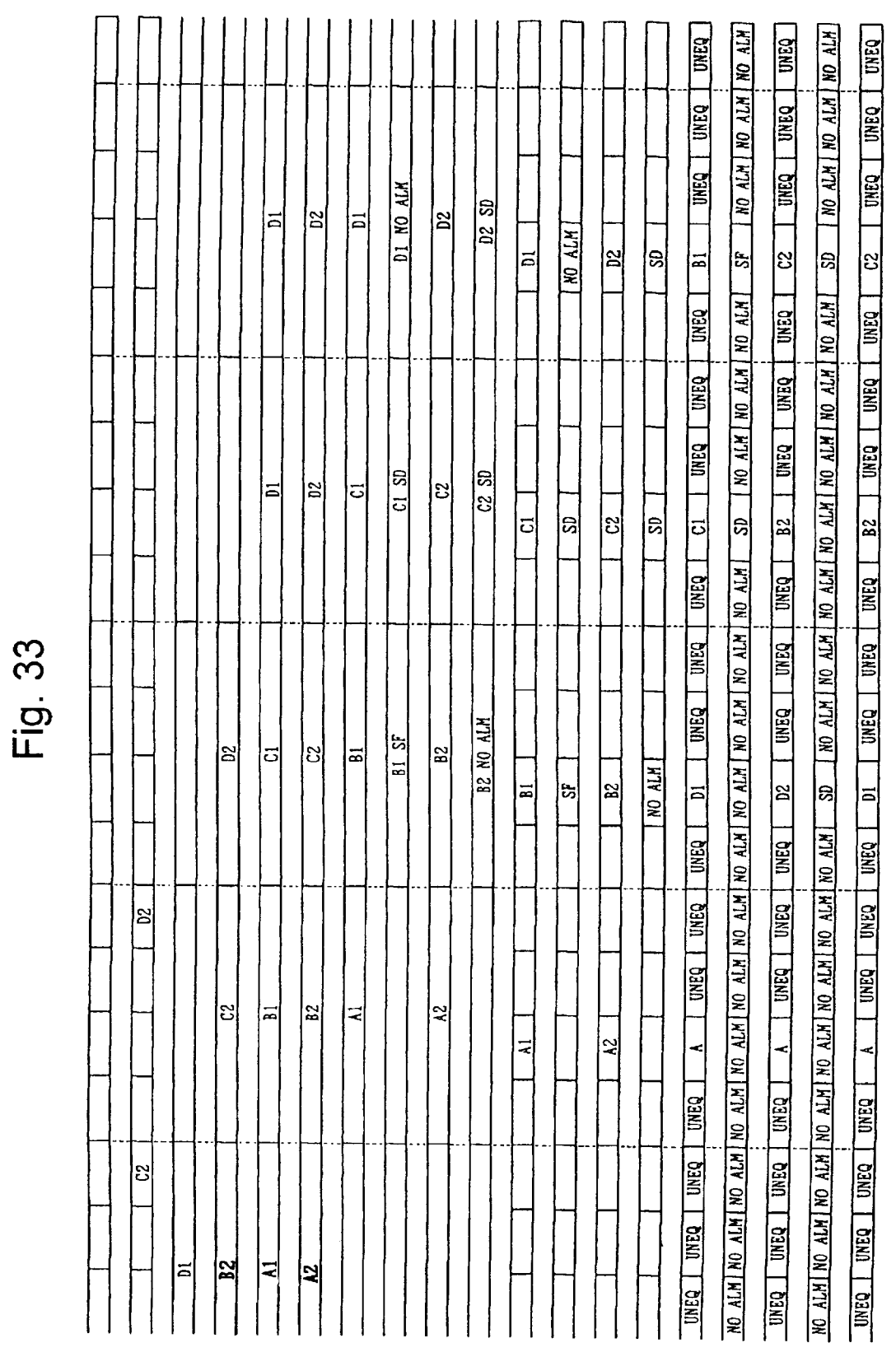

With this limitation, the exchange of time slots is inhibited for a connection between high-order signal groups. For a connection between a high-order and a low-order group, time slots can be switched freely. The time chart of individual signals in this embodiment in FIG. 31 is shown in FIGS. 32 and 33. Reference numerals in parentheses in FIG. 32 correspond to those in FIG. 31.

As is described above in the embodiments, according to the present invention, a large-scale line setting function can be provided. Since high reliability for the line setting is obtained, the line redundancy function and an efficient circuit structure can be acquired. Therefore, a circuit structure can be provided where the setting for the validity and the invalidity of the line setting function is flexible and efficient.

In addition, an Add/Drop MUX device can be arranged by using the same line setting circuit.

The above explained embodiments and drawings are used only for explaining the present invention, and therefore, the present invention is not restricted to the embodiments and drawings. The protective scope of the present invention is determined by the description of the attached claims, and the equivalents to the claims are within the scope of the present invention.

What is claimed is:

1. A cross-connecting system for receiving an SDH interface frame signal, separating a virtual container line signal that is multiplexed into said SDH interface signal and connecting said virtual container line signal to one of output terminals, comprising:

a signal receiver receiving primary signals, detecting alarm information contained in said primary signals, and performing conversion of said primary signals in consonance with occasions when said alarm information is generated;

a signal synchronizer receiving said primary signals and said alarm information from said signal receiver, and switching respective phases of said primary signals and said alarm information to phases based on one common clock; and a TSI function section exchanging time slots of said primary signals output from said signal synchronizer and outputting said primary signals having exchanged time slots.

2. The cross-connecting system according to claim 1, wherein said one common clock is output from said TSI function unit.

3. The cross-connecting system according to claim 1, wherein said TSI function unit includes a memory storing said primary signals, and said primary signals are read from said memory in a sequential order that differs from that in which said primary signals have been written to said memory, so that time slots of said primary signals are exchanged.

4. The cross-connecting system according to claim 1, wherein said TSI function unit has two memories storing said primary signals, and a signal selector selecting to read said primary signals out from said memories, alternately.

5. The cross-connecting system according to claim 1, wherein said TSI function unit includes n sets of two memories storing said primary signals, n signal selectors each for controlling the two memories to output said primary signals, alternately, and an output selector for selecting one of said n signal selectors to output primary signals out from the two memories controlled by the selected one of the n signal selectors.

6. The cross-connecting system according to claim 1, further comprising a signal generator including a memory storing an output of said TSI function unit, and an overhead data insertion circuit inserting overhead data into data read out from said memory.

7. The cross-connecting system according to claim 6, wherein said primary signal is an optical signal, said signal receiver includes an optical to electrical signal converter, and said signal generator includes an electrical to optical signal converter.

8. The cross-connecting system according to claim 6, wherein said primary signal is an STM-n signal, said signal receiver includes a circuit demultiplexing said STM-n signal into a plurality of STM-1 signals, and said signal synchronizer synchronizes phases of said plurality of STM-1 signals.

9. Across connection system for time-division multiplexed signals comprising:

first means for demultiplexing an input STM-n signal into a plurality of STM-1 signals;

second means for adjusting phases of said plurality of STM-1 signals to match frame timing positions;

third means for monitoring, for each channel, alarm conditions of VC-n signals which are multiplexed with said plurality of STM-1 signals, and for adding a signal identifying said monitored alarm condition to said signals of which said phases have been adjusted by said second means;

fourth means for generating STM-n signals with which VC-12 UNEQ signals are multiplexed; and fifth means for inserting an arbitrary VC-n of a lower output from said third means into an upper output from said third means or into an output from said fourth means.

10. The cross connection system according to claim 9, wherein said fifth means includes line selection means for selecting either one of two signals cross-connected according to a condition signal, which is added to said VC-n signal provided in said two signals.

11. The cross connection system according to claim 10, wherein for a set time slot, an alarm for a signal sent from an upper level is compared with an alarm for a signal to be inserted, and the signal having a higher quality is selected.

12. The cross connection system according to claim 9, wherein said fifth means includes a data memory having two sides of capacities adequate for storing one row of STM-n signals and an alarm signal; an address memory storing input source data for each byte of data for one row, which is to be output from said data memory; and a selector selecting either a UNEQ signal, or data read out from said data memory, in consonance with contents of said address memory.

13. The cross connection system according to claim 12, wherein said input source data stored in said address memory includes information concerning whether said input source data is a UNEQ signal or data read from said data memory, and addresses of data to be read from said data memory; wherein in said address memory is stored data for determining whether or not a time slot is used for redundancy; and wherein a selector discriminator is provided controlling a selection by said selector by using information concerning whether data is through input data or data read from said memory, information for determining whether or not said time slot in said address memory is used for redundancy, and alarm information for each signal.

14. The cross connection system according to claim 9, wherein said STM-n signals are STM-4 signals.

* * * * *